US007853698B2

(12) United States Patent
Stanev et al.

(10) Patent No.: US 7,853,698 B2
(45) Date of Patent: Dec. 14, 2010

(54) INTERNAL PERSISTENCE OF SESSION STATE INFORMATION

(75) Inventors: Georgi Stanev, Sofia (BG); Gailin Galchev, Sofia (BG)

(73) Assignee: SAP AG, Walldorf (DE)

(*) Notice: Subject to any disclaimer, the term of this patent is extended or adjusted under 35 U.S.C. 154(b) by 1452 days.

(21) Appl. No.: 11/117,993

(22) Filed: Apr. 29, 2005

(65) Prior Publication Data

US 2006/0248036 A1 Nov. 2, 2006

(51) Int. Cl.
*G06F 15/16* (2006.01)
(52) U.S. Cl. .......................................... 709/227; 718/1
(58) Field of Classification Search ................. 709/250, 709/227; 719/319; 707/104.1, 10; 718/1
See application file for complete search history.

(56) References Cited

U.S. PATENT DOCUMENTS

| | | | |
|---|---|---|---|
| 5,274,804 A | 12/1993 | Jackson et al. | |
| 5,692,193 A | 11/1997 | Jagannathan et al. | |
| 5,805,790 A * | 9/1998 | Nota et al. ................ | 714/10 |
| 5,835,724 A | 11/1998 | Smith | |
| 5,870,742 A | 2/1999 | Chang et al. | |
| 5,884,316 A | 3/1999 | Bernstein et al. | |
| 5,974,443 A | 10/1999 | Jeske | |
| 6,047,295 A | 4/2000 | Endicott et al. | |
| 6,098,093 A * | 8/2000 | Bayeh et al. ............. | 709/203 |
| 6,216,152 B1 * | 4/2001 | Wong et al. .............. | 709/203 |
| 6,339,782 B1 * | 1/2002 | Gerard et al. ............... | 718/1 |
| 6,389,460 B1 | 5/2002 | Stewart et al. | |
| 6,502,148 B1 | 12/2002 | Krum | |
| 6,523,027 B1 | 2/2003 | Underwood | |
| 6,539,445 B1 | 3/2003 | Krum | |
| 6,654,765 B2 * | 11/2003 | Wong et al. ................ | 1/1 |

(Continued)

FOREIGN PATENT DOCUMENTS

EP 1387262 A1 2/2004

(Continued)

OTHER PUBLICATIONS

Thomas Smits, Unbreakable Java, Nov. 16, 2004.*

(Continued)

*Primary Examiner*—Ajay Bhatia
(74) *Attorney, Agent, or Firm*—Schwegman, Lundberg & Woessner, P.A.

(57) ABSTRACT

A method is described for a computing system with multiple virtual machines that does not support persistence of session information in a shared memory that is internal to the computing system and that is accessible to each of the virtual machines. The method involves receiving a deployment descriptor that specifies a persistence scope that does not extend beyond the computing system. Then, as a consequence of the receiving, a plug-in is instantiated for the computing system's file system. The, over the course of a session, managing the persistence of the session's session state information in the computing system's file system by, with program code provided by the plug-in, translating a first command that is not specific to the file system into a second command that is specific to the file system. The session state information comprises a plurality of attributes. The command causes a process to be performed The process is selected from the group consisting of: storing in the file system one of the attributes; and, retrieving from the file system one of the attributes.

18 Claims, 18 Drawing Sheets

U.S. PATENT DOCUMENTS

| | | | |
|---|---|---|---|
| 6,665,674 B1 | 12/2003 | Buchanan et al. | |
| 6,675,214 B2 | 1/2004 | Stewart et al. | |
| 6,842,770 B1 | 1/2005 | Serlet et al. | |
| 6,854,115 B1* | 2/2005 | Traversat et al. | 718/1 |
| 6,895,584 B1 | 5/2005 | Belkin | |
| 6,934,755 B1* | 8/2005 | Saulpaugh et al. | 709/226 |
| 6,938,085 B1 | 8/2005 | Belkin et al. | |
| 6,941,307 B2 | 9/2005 | Papanikolaou et al. | |
| 6,950,822 B1 | 9/2005 | Idicula et al. | |
| 7,013,329 B1 | 3/2006 | Paul et al. | |
| 7,139,792 B1 | 11/2006 | Mischra et al. | |
| 7,165,241 B2* | 1/2007 | Manda et al. | 717/124 |
| 7,167,917 B2 | 1/2007 | Creamer et al. | |
| 7,174,363 B1 | 2/2007 | Goldstein et al. | |
| 7,177,823 B2 | 2/2007 | Lam et al. | |
| 7,184,922 B2 | 2/2007 | Ousley et al. | |
| 7,185,096 B2 | 2/2007 | Kalyanavarathan et al. | |
| 7,197,568 B2 | 3/2007 | Bourne et al. | |
| 7,231,435 B2 | 6/2007 | Ohta | |
| 7,254,634 B1 | 8/2007 | Davis et al. | |
| 7,266,616 B1 | 9/2007 | Munshi et al. | |
| 7,277,935 B2 | 10/2007 | Sato | |
| 7,296,267 B2* | 11/2007 | Cota-Robles et al. | 718/1 |
| 7,302,423 B2 | 11/2007 | De Bellis | |
| 7,302,609 B2 | 11/2007 | Matena et al. | |
| 7,308,501 B2 | 12/2007 | DeLima et al. | |
| 7,373,661 B2 | 5/2008 | Smith et al. | |
| 7,406,692 B2* | 7/2008 | Halpern et al. | 709/245 |
| 7,409,709 B2 | 8/2008 | Smith et al. | |
| 7,412,532 B2 | 8/2008 | Gondhalekar et al. | |
| 7,418,560 B2* | 8/2008 | Wintergerst | 711/147 |
| 7,421,495 B2 | 9/2008 | Yang et al. | |
| 7,467,162 B2 | 12/2008 | Rosenbloom et al. | |
| 7,543,051 B2 | 6/2009 | Greifeneder et al. | |
| 7,543,289 B2 | 6/2009 | Cai et al. | |
| 7,590,727 B1 | 9/2009 | Barnes | |
| 2001/0054004 A1 | 12/2001 | Powers | |
| 2002/0078060 A1 | 6/2002 | Garst et al. | |
| 2002/0078192 A1 | 6/2002 | Kopsell et al. | |
| 2002/0116505 A1 | 8/2002 | Higgins et al. | |
| 2002/0143958 A1 | 10/2002 | Montero et al. | |
| 2002/0161957 A1 | 10/2002 | Comeau et al. | |
| 2002/0165909 A1 | 11/2002 | Martin et al. | |
| 2002/0198923 A1 | 12/2002 | Hayes, Jr. | |
| 2003/0014521 A1 | 1/2003 | Elson et al. | |
| 2003/0014525 A1 | 1/2003 | DeLima et al. | |
| 2003/0018707 A1 | 1/2003 | Flocken | |
| 2003/0033344 A1* | 2/2003 | Abbott et al. | 709/1 |
| 2003/0074580 A1 | 4/2003 | Knouse et al. | |
| 2003/0084248 A1 | 5/2003 | Gaither et al. | |
| 2003/0167333 A1 | 9/2003 | Kumar et al. | |
| 2003/0177382 A1 | 9/2003 | Ofek et al. | |
| 2003/0212654 A1 | 11/2003 | Harper et al. | |
| 2003/0229529 A1 | 12/2003 | Mui et al. | |
| 2004/0024971 A1 | 2/2004 | Bogin et al. | |
| 2004/0068554 A1 | 4/2004 | Bales et al. | |
| 2004/0098726 A1 | 5/2004 | Currie et al. | |
| 2004/0117486 A1 | 6/2004 | Bourne et al. | |
| 2004/0153509 A1 | 8/2004 | Alcorn et al. | |
| 2004/0172618 A1 | 9/2004 | Marvin | |
| 2004/0181537 A1 | 9/2004 | Chawla et al. | |
| 2004/0186906 A1 | 9/2004 | Torrant et al. | |
| 2004/0210500 A1 | 10/2004 | Sobel et al. | |
| 2004/0221261 A1 | 11/2004 | Blevins | |
| 2004/0250248 A1* | 12/2004 | Halpern et al. | 718/100 |
| 2005/0216421 A1 | 9/2005 | Barry et al. | |
| 2005/0256880 A1 | 11/2005 | Nam et al. | |
| 2005/0278270 A1 | 12/2005 | Carr et al. | |
| 2005/0278278 A1 | 12/2005 | Petev | |
| 2005/0278341 A1 | 12/2005 | Kostadinov et al. | |
| 2005/0278346 A1 | 12/2005 | Shang et al. | |
| 2005/0283585 A1 | 12/2005 | Sexton et al. | |
| 2005/0289536 A1 | 12/2005 | Nayak et al. | |
| 2006/0026286 A1 | 2/2006 | Lei et al. | |
| 2006/0029054 A1 | 2/2006 | Breh et al. | |
| 2006/0036448 A1 | 2/2006 | Haynie et al. | |
| 2006/0047974 A1 | 3/2006 | Alpern et al. | |
| 2006/0053087 A1 | 3/2006 | Pavlov | |
| 2006/0053112 A1 | 3/2006 | Chitkara et al. | |
| 2006/0117316 A1 | 6/2006 | Cismas et al. | |
| 2006/0130063 A1 | 6/2006 | Kilian et al. | |
| 2006/0143217 A1* | 6/2006 | Stanev et al. | 707/102 |
| 2006/0143328 A1 | 6/2006 | Fleischer et al. | |
| 2006/0143387 A1* | 6/2006 | Petev et al. | 711/130 |
| 2006/0143389 A1 | 6/2006 | Kilian et al. | |
| 2006/0143608 A1 | 6/2006 | Dostert et al. | |
| 2006/0143609 A1 | 6/2006 | Stanev | |
| 2006/0155756 A1 | 7/2006 | Stanev | |
| 2006/0155867 A1 | 7/2006 | Kilian et al. | |
| 2006/0206856 A1 | 9/2006 | Breeden et al. | |
| 2006/0236306 A1 | 10/2006 | DeBruin et al. | |
| 2006/0248119 A1 | 11/2006 | Stanev et al. | |
| 2006/0248198 A1 | 11/2006 | Galchev | |
| 2006/0248199 A1* | 11/2006 | Stanev | 709/227 |
| 2006/0248200 A1 | 11/2006 | Stanev | |
| 2006/0248283 A1 | 11/2006 | Galchev et al. | |
| 2006/0248350 A1* | 11/2006 | Stanev | 713/189 |
| 2007/0245167 A1 | 10/2007 | De La Cruz et al. | |
| 2008/0086564 A1 | 4/2008 | Putman et al. | |
| 2008/0201417 A1 | 8/2008 | McCain et al. | |
| 2008/0222270 A1 | 9/2008 | Gilbert | |

FOREIGN PATENT DOCUMENTS

| | | |
|---|---|---|
| WO | WO-0023898 A1 | 4/2000 |
| WO | WO-03073204 A2 | 9/2003 |
| WO | WO-2004038586 A2 | 5/2004 |

OTHER PUBLICATIONS

Dagfinn Parnas, SAP Virtual Machine Container, Oct. 23, 2004.*

Speaker Name, Vrtual Machine Container: Unbreakable Java, 2003.*

SAP Transactions and the VM Container & Resource Management in the VM Container, printed Sep. 12, 2009.*

Jipping, M. J., Bugaj, A., Mihalkova, L., and Porter, D. E. 2003. Using Java to teach networking concepts with a programmable network sniffer. SIGCSE Bull. 35, 1 (Jan. 2003), 120-124. DOI= http://doi.acm.org/10.1145/792548.611948.*

"U.S. Appl. No. 11/025,200 , Final Office Action mailed Nov. 16, 2009", 10 Pgs.

"U.S. Appl. No. 11/025,200, Non Final Office Action mailed Mar. 24, 2009", 12 pgs.

"U.S. Appl. No. 11/025,200, Preliminary Amendment filed Mar. 24, 2005", 4 pgs.

"U.S. Appl. No. 11/025,200, Response filed Jun. 24, 2009 to Non Final Office Action mailed Mar. 24, 2009", 14 pgs.

"U.S. Appl. No. 11/025,200, Response filed Jan. 12, 2010 to Final Office Action mailed Nov. 16, 2009", 5 pgs.

"U.S. Appl. No. 11/025,316, Non-Final Office Action mailed Jul. 21, 2009", 9 pgs.

"U.S. Appl. No. 11/025,549, Final Office Action mailed Nov. 4, 2009", 9 Pgs.

"U.S. Appl. No. 11/025,549, Non-Final Office Action mailed Mar. 24, 2009", 13 pgs.

"U.S. Appl. No. 11/025,549, Preliminary Amendment filed Mar. 21, 2005", 4 pgs.

"U.S. Appl. No. 11/025,549, Response filed Jun. 24, 2009 to Non Final Office Action mailed Mar. 24, 2009", 9 pgs.

"U.S. Appl. No. 11/025,549, Response filed Jan. 4, 2010 to Final Office Action mailed Nov. 4, 2009", 13 pgs.

"U.S. Appl. No. 11/118,018, Non Final Office Action mailed Oct. 20, 2009", 26 pgs.

"U.S. Appl. No. 11/118,018, Non-Final Office Action mailed Mar. 20, 2009", 13 pgs.

"U.S. Appl. No. 11/118,018, Response filed Jan. 19, 2010 to Non Final Office Action mailed Oct. 20, 2009", 11 pgs.
"U.S. Appl. No. 11/118,018, Response filed Jun. 19, 2009 to Non Final Office Action mailed Mar. 20, 2009", 14 pgs.
"U.S. Appl. No. 11/118,019, Final Office Action mailed Sep. 16, 2009", 17 Pgs.
"U.S. Appl. No. 11/118,019, Non Final Office Action mailed Nov. 13, 2008", 9 pgs.
"U.S. Appl. No. 11/118,019, Response filed Feb. 12, 2009 to Non Final Office Action mailed Nov. 13, 2008", 5 pgs.
"U.S. Appl. No. 11/118,019, Response filed Nov. 11, 2009 to Final Office Action mailed Sep. 16, 2009", 8 pgs.
"U.S. Appl. No. 11/118,020, Advisory Action mailed Jan. 14, 2010", 3 pgs.
"U.S. Appl. No. 11/118,020, Final Office Action mailed Nov. 5, 2009", 12 pgs.
"U.S. Appl. No. 11/118,020, Non Final Office Action mailed Feb. 24, 2009", 9 pgs.
"U.S. Appl. No. 11/118,020, Response filed Jan. 5, 2010 to Final Office Action mailed Nov. 5, 2009", 14 pgs.
"U.S. Appl. No. 11/118,020, Response filed May 26, 2009 to Non Final Office Action mailed Feb. 24, 2009", 12 pgs.
"U.S. Appl. No. 11/118,890, Advisory Action mailed Sep. 14, 2009", 3 pgs.
"U.S. Appl. No. 11/118,890, Final Office Action mailed May 6, 2009", 10 pgs.
"U.S. Appl. No. 11/118,890, Non Final Office Action mailed Sep. 18, 2008", 8 pgs.
"U.S. Appl. No. 11/118,890, Non-Final Office Action mailed Dec. 24, 2009", 10 Pgs.
"U.S. Appl. No. 11/118,890, Response filed Jan. 20, 2009 to Non Final Office Action mailed Sep. 18, 2008", 18 pgs.
"U.S. Appl. No. 11/118,890, Response filed Sep. 2, 2009 to Final Office Action mailed May 6, 2009", 11 pgs.
"U.S. Appl. No. 11/118,976, Advisory Action mailed Mar. 30, 2009", 3 pgs.
"U.S. Appl. No. 11/118,976, Final Office Action mailed Feb. 3, 2009", 17 pgs.
"U.S. Appl. No. 11/118,976, Final Office Action mailed Feb. 21, 2008", 15 pgs.
"U.S. Appl. No. 11/118,976, Non Final Office Action mailed Aug. 21, 2008", 17 pgs.
"U.S. Appl. No. 11/118,976, Non Final Office Action mailed Aug. 31, 2007", 14 pgs.
"U.S. Appl. No. 11/118,976, Non-Final Office Action mailed Jun. 11, 2009", 22 pgs.
"U.S. Appl. No. 11/118,976, Non-Final Office Action mailed Dec. 8, 2009.", 24 pgs.
"U.S. Appl. No. 11/118,976, Response filed Mar. 19, 2009 to Final Office Action mailed Feb. 3, 2009", 11 pgs.
"U.S. Appl. No. 11/118,976, Response filed May 23, 2008 to Final Office Action mailed Feb. 21, 2008", 11 pgs.
"U.S. Appl. No. 11/118,976, Response filed Sep. 9, 2009 to Non Final Office Action mailed Jun. 11, 2009", 18 pgs.
"U.S. Appl. No. 11/118,976, Response filed Nov. 21, 2008 to Non Final Office Action mailed Aug. 21, 2008", 13 pgs.
"U.S. Appl. No. 11/118,976, Response filed Nov. 30, 2007 to Non Final Office Action mailed Aug. 31, 2007", 13 pgs.
"IBM Linux Scholar Challenge: Phil and Matt's", *Clarkson university*, www.ibm.com/develperworks/ibm/library/i-clarkson/philandmatt.html, (Jun. 1, 2002), 1-7.
"Linux threads Frequently Asked Questions (FAQ), by Sean Walton, KB7rfa", www.lians.org/linux/threads-fad.html, (Sep 19,1996), 1-15.
"Microsoft TechNet: Step by step Guide to the Microsoft Management Console", *Microsoft Corp.*, www.technet.microsoft.com/en-us/library/bb742442.aspx, (Jan. 1, 2000), 1-7.
Osdir, "Re: Barracude: Reference Objects in Session/ServletContext", msg#00056, (Nov. 2002).
Pasin, Macia, et al., "High-Available Enterprise JavaBeans Using Group Communication System Support", *XP002285985*, 1-6.
Silberschatz, A, et al., "Operating Systems Concepts", *Yale University*, (*John Wiley & Sons.inc*), *7th edition*, www.wiley.com/college/egradeplus, (Dec. 2004), 131,833.
"U.S. Appl. No. 11/025,200, Advisory Action mailed Feb. 3, 2010", 3 pgs.
"U.S. Appl. No. 11/025,200, Response filed Feb. 9, 2010 to Advisory Action mailed Feb. 3, 2010", 15 pgs.
"U.S. Appl. No. 11/025,200 Non-Final Office Action mailed Mar. 3, 2010", 11 pgs.
"U.S. Appl. No. 11/118,020, Non-Final Office Action mailed Feb. 26, 2010", 19 pgs.
"U.S. Appl. No. 11/118,976, Response filed Mar. 8, 2010 to Non Final Office Action mailed Dec. 8, 2009", 20 pgs.
"U.S. Appl. No. 11/117,851, Non-Final Office Action mailed Mar. 17, 2010", 17 pgs.
"U.S. Appl. No. 11/118,018, Final Office Action mailed Apr. 9, 2010", 29 pgs.
"U.S. Appl. No. 11/118,019, Non-Final Office Action mailed Mar. 16, 2010", 19 pgs.
"U.S. Appl. No. 11/118,890, Pre-Appeal Brief Request mailed Mar. 24, 2010", 5 pgs.
"Java 2 v.1.5.0. Class Thread", [Online]. Retrieved from the Internet: <URL: http://web.archive.org/web/20040604194528/http://java.sun.com/j2se/1.5.0/docs/api/java/langlThread.html.>, (Jun. 2004), 1-26 pgs.
Bubak, "Hydra—Decentralized and Adaptive Approach to Distributed Computing", PARA, (2000), 242-249 pgs.
"U.S. Appl. No. 11/118,019, Response filed Jun. 9, 2010 to Non Final Office Action mailed Mar. 16, 2010", 12 pgs.
"U.S. Appl. No. 11/118,020, Response filed May 18, 2010 to Non Final Office Action mailed Feb. 26, 2010", 15 pgs.
"U.S. Appl. No. 11/118,890, Examiner Interview Summary mailed Mar. 2, 2010", 3 pgs.
"U.S. Appl. No. 11/118,976, Examiner Interview Summary mailed Mar. 2, 2010", 3 pgs.
"U.S. Appl. No. 11/118,976, Notice of Allowance mailed May 17, 2010", 18 pgs.

* cited by examiner

INTERNAL PERSISTENCE OF SESSION STATE INFORMATION

FIELD OF INVENTION

The field of the invention relates to the software arts; and, more specifically, the Internal Persistence Of Session State Information.

BACKGROUND

Sessions and Information

A "session" can be viewed as the back and forth communication over a network between a pair of computing systems. Referring to FIG. 1, in the case of a client/server architecture, basic back and forth communication involves a client 101 sending a server 100 a "request" that the server 100 interprets into some action to be performed by the server 100. The server 100 then performs the action and if appropriate returns a "response" to the client 101 (e.g., a result of the action). Often, a session will involve multiple, perhaps many, requests and responses. A single session through one or more of its requests may invoke the use of different application software programs.

An aspect of session management is the use of session state information over the course of a session's end-to-end lifetime. Session state information is a record of the status and/or use of a session. For example, as part of a server's response process, the server may save in the session state information a time in the future at which the session is to be deemed "expired" if a next request is not received by the server for that session beforehand. Session state information may also include information used to "pick-up" a session from where it last "left-off" (such as the latest understood state of a client's web browser), and/or, data or other information sent to the user over the course of the session (such as one or more graphics or animation files whose content is presented to the client as part of the client's session experience)

Persistence

In the software arts, "persistence" is a term related to the saving of information. Generally, persisted information is saved in such a fashion such that, even if the entity that most recently used and saved the information suffers a crash, the information is not lost and can be retrieved at a later time despite the occurrence of the crash. For example, if a first virtual machine suffers a crash after using and saving information to persistent storage, a second virtual machine may, subsequent to the crash, gain access to and use the persistently saved information.

FIG. 2 provides a simple example of the concept of "persistence" as viewed from the perspective of a single computing system 200. Note that the computing system 200 of FIG. 2 includes DRAM based system memory 210 and a file system 220 (noting that a file system is typically implemented with one or more internal hard disk drives, external RAID system and/or internal or external tape drives). Traditionally, the system memory 210 is deemed "volatile" while the file system 220 is deemed "non-volatile". A volatile storage medium is a storage medium that loses its stored data if it ceases to receive electrical power. A non volatile storage medium is a storage medium that is able to retain its stored data even if it ceases to receive electrical power.

Because a file system 220 is generally deemed non-volatile while a system memory 210 is deemed volatile, from the perspective of the data that is used by computing system and for those "crashes" of the computing system effected by a power outage, the file system 220 may be regarded as an acceptable form of persistent storage while the system memory 210 is not. Here, if the computing system saves a first item of data to the system memory 210 and a second item of data to the file system 220 and then subsequently crashes from a power outage, the second item of data can be recovered after the crash while the first item of data cannot. File systems can be internal or external (the later often being referred to as "file sharing" because more than one computing system may access an external file system).

Another form of acceptable persistence storage relative to computing system 200 is an external database 230. A database 230 is most often implemented with a computing system having "database software". Database software is a form of application software that not only permits data to be stored and retrieved but also assists in the organization of the stored data (typically in a tabular form from the perspective of a user of the database software). Traditionally, database software have been designed to respond to commands written in a structure query language (SQL) or SQL-like format. Here, referring back to FIG. 2, if the computing system stores an item of data in the external database and then subsequently crashes, the item of data can still be accessed from the external database.

External databases are particularly useful where information is to be made accessible to more than one computing system. For example, if the external database 230 is designed to hold the HTML file for a popular web page, and if the depicted computing system 200 is just one of many other computing systems (not shown in FIG. 2) that are configured to engage in communicative sessions with various clients, each of these computing systems can easily engage is sessions utilizing the popular web page simply by being communicatively coupled to the database. External file systems also exist.

Persistence of Session State Information

FIG. 3 shows that session management 301 and persistence 302 functions may overlap. Notably, the persistence of a session's session state information permits the possibility of a session to be successfully continued even if an entity that was handling the session crashes. For example, if a first virtual machine assigned to handle a session crashes after the virtual machine both responds to the session's most recent client request and persists the corresponding state information, upon the reception of the next client request for the session, a second virtual machine may seamlessly handle the new request (from the perspective of the client) by accessing the persisted session state information. That is, the second virtual machine is able to continue the session "mid-stream" because the session's state information was persisted.

FIGURES

The present invention is illustrated by way of example, and not limitation, in the figures of the accompanying drawings in which like references indicate similar elements and in which:

FIG. 5 shows file system persistent storage interface and an external database persistent storage plug-in;

SUMMARY

A method is described for a computing system with multiple virtual machines that does not support persistence of session information in a shared memory that is internal to the computing system and that is accessible to each of the virtual machines. The method involves receiving a deployment descriptor that specifies a persistence scope that does not extend beyond the computing system. Then, as a consequence of the receiving, a plug-in is instantiated for the computing system's file system. The, over the course of a session, managing the persistence of the session's session state information in the computing system's file system by, with program code provided by the plug-in, translating a first command that is not specific to the file system into a second command that is specific to the file system. The session state information comprises a plurality of attributes. The command causes a process to be performed The process is selected from the group consisting of: storing in the file system one of the attributes; and, retrieving from the file system one of the attributes.

DETAILED DESCRIPTION 1.0 In-Memory Session Domains

According to an object oriented implementation, state information for a particular session may be stored in a "session" object. In the context of a request/response cycle (e.g., an HTTP request/response cycle performed by a server in a client/server session), the receipt of a new request for a particular session causes the session's session object to be: 1) retrieved from some form of storage; 2) updated to reflect the processing of the response to the request; and, 3) re-stored so that it can be retrieved for the processing of the next request for the session. Here, a session object may be created by the server for each session that the server recognizes itself as being actively engaged in. Thus, for example, upon the receipt of a first request for a new session, the server will create a new session object for that session and, over the course of the session's lifetime, the server can retrieve, update and re-store the session object (e.g., for reach request/response cycle if necessary).

The server may be a Java 2 Enterprise Edition ("J2EE") server node which support Enterprise Java Bean ("EJB") components and EJB containers (at the business layer) and Servlets and Java Server Pages ("JSP") (at the presentation layer). Of course, other embodiments may be implemented in the context of various different software platforms including, by way of example, Microsoft.NET, Microsoft Transaction Server (MTS), the Advanced Business Application Programming ("ABAP") platforms developed by SAP AG and comparable platforms. For simplicity, because a server is a specific type of computing system, the term "computing system" will be largely used throughout the present discussion. It is expected however that many practical applications of the teachings provided herein are especially applicable to servers.

Figure 4:
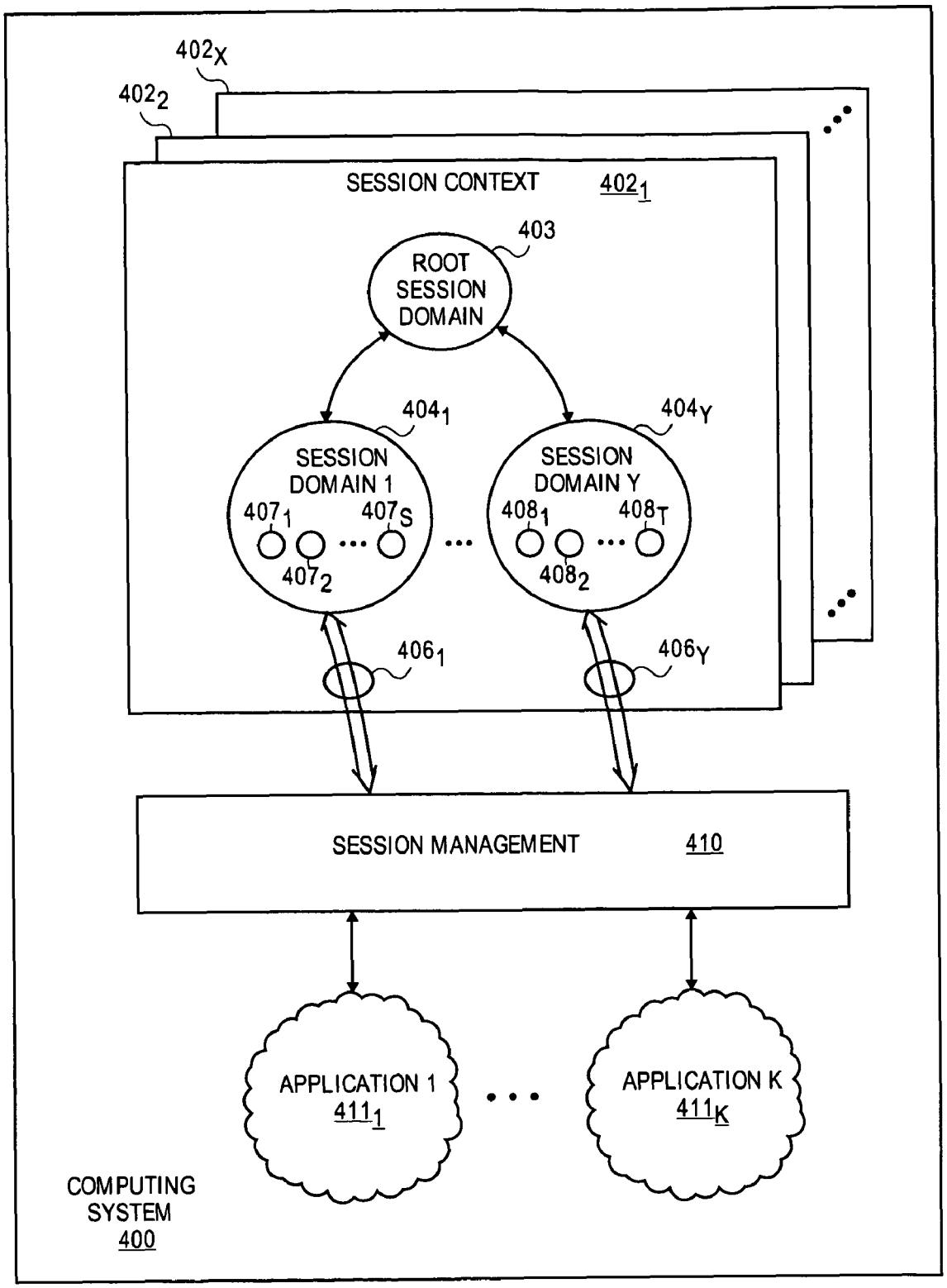
FIG. 4 shows a hierarchical organization of session domains.

At any given time, a computing system may be engaged in a large number of active sessions. As such, in the simple case where a session object exists for each session that the computing system is actively engaged in, the computing system will have to manage and oversee the storage of a large number of session objects. FIG. 4 shows a session management layer 410 that is designed to store session state data according to a hierarchical scheme 402. According to a basic approach, session objects that are to be treated according to a same set of session management criteria are stored within a same region of the hierarchy.

Thus, for example, as depicted in FIG. 4, each of the S sessions associated with session objects $407_1$ through $407_S$ will be treated according to a first set of session management criteria because their corresponding sessions objects $407_1$ through $407_S$ are stored in session domain 1 $404_1$; and, each of the T sessions associated with session objects $408_1$ through $408_T$ will be treated according to a second set of session management criteria because their corresponding sessions objects $407_1$ through $408_T$ are stored in a session domain 2 $404_Y$. In an implementation, each session domain is accessed through reference to a specific region of memory (e.g., through a hashtable that maps keys to values).

Here, again according to a basic approach, the treatment applied to the S sessions will be different than the treatment applied to the T sessions because their respective session objects are stored in different storage domains $404_1$, $404_Y$ (because different session domains correspond to unique combinations of session management criteria). Session management criteria generally includes one or more parameters that define (or at least help to define) how a session is to be managed such as: 1) the session's maximum inactive time interval (e.g., the maximum amount of time that may elapse between the arrival of a request and the arrival of a next request for a particular session without that session being declared "expired" for lack of activity); 2) the maximum number of outstanding requests that may be entertained by the computing system for the session at any one time; 3) the session's access policy (which indicates whether the session can be accessed by multiple threads (i.e., is multi-threaded) or can only be accessed by a single thread); 4) the session's invalidation policy (e.g., whether or not the session object for an inactivated session is persisted or not); and, 5) the type of persistent storage to be used.

According to one approach, one or more session management criteria items for a particular session domain (such as any combination of those described just above) is stored within the session domain separately from the one or more session objects that are stored within the same session domain. Such an approach may improve efficiency because, at an extreme, the session objects need not carry any session management criteria information and may instead carry only pure session state information (e.g., the expiration time of the session, the most recent understood state of the client's web browser, etc.).

In the case of an application server computing system, clients engage in sessions with the computing system so that they can use application software located on the computing system. The application software (including any "pages" such as those from which the execution of a specific software routine may be triggered) may be run on the computing system and/or downloaded to and run on the client. In an approach that may be alternate to or combined with the basic embodiment described just above in which session domains are reserved for unique combinations of session management criteria, session domains may be established on a "per application" basis. That is, a first session domain may be established in the hierarchy for a first application, and, a second session domain may be established in the hierarchy for a second application. In an alternate or combined implementation, entire hierarchy trees (each having its own root node 403) are instantiated on a "per application" basis.

Depending on implementation preference, different applications having identical session management treatment policies may have their session objects stored in the same session domain or in different session domains. Moreover, again according to implementation preference, a single session domain may be created for the session objects of sessions that deserve "related" rather than "identical" session management treatment (e.g., for a particular session domain, some but not all session management criteria characteristics are identical; and/or, a range of possible criteria values is established for a particular session domain such as sessions having a maximum inactive time interval within a particular time range).

The storage hierarchy may also include the notion of parent and children nodes. In one configuration, a child node has the same lifecycle as its parent node. Thus, if the parent domain is destroyed all of its children nodes are destroyed. The domain hierarchy provides different space for the sessions (session domains) grouping it in logical structure similar to the grouping files to the folders. According to an implementation, the root 403 is used to provide high-level management of the entire hierarchy tree rather than to store session information. For example, if an application consists of many Enterprise Java Bean (EJB) sub applications you should be able to manage the sessions of different EJB components separately. As such, isolation between different EJB sub-applications is achieved by instantiating different session domains for different EJB components, while at the same time, there should exist the ability to manage the entire application as a whole.

For example, to remove all sessions of an application after removal of the whole application. Grouping the sessions in tree structure (where the root presents the application and the various children present the different ejb's) you can easily destroy all the sessions after removing the application simply by destroying the root.

The nomenclature of session domains $404_1$ through $404_Y$ is meant to convey that a wide range of different session domains (at least Y of them) may be established for a particular "context". Different hierarchy "contexts" $402_1$, $402_2$, ... $402_X$ are depicted in FIG. 4. The processing of a complete request/response often involves the processing of different active segments of code within the computing system. For example, a first segment of code may setup and teardown specific "ports" through which a session's data flows in and out of the computing system, a second segment of code may handle the protocol between the client and computing system (e.g., an HTTP or HTTPS protocol), a third segment of code may be the actual application software that is invoked by the client (e.g., specific objects or components in an object oriented architecture (such as Enterprise Java Beans (EJBs) in a Java environment)).

Each of these different segments of code may depend on their own session state information in order to support the session over the course of its lifetime. As such, in an embodiment, different contexts are established, each containing its own hierarchy of session domains, for the different segments of code. For example, continuing with the example provided just above, context $402_1$ may be used to store client/server protocol session state information, context $402_2$ may be used to store computing system port session state information, and context $402_X$ may be used to store EJB session state information. For simplicity the remainder of the present application will focus largely on client/server communication protocol session state information (e.g., HTTP session state information) that is kept in object(s) within an object oriented environment.

Referring to FIG. 4, a session management layer 410 is observed interfacing with the session domain storage hierarchy 402 to support sessions between one or more clients and software applications $411_1$ through $411_K$. According to one implementation, the session management layer 410 accesses $406_1, \ldots, 406_Y$ the information stored in their respective session domains on behalf of the applications $411_1$ through $411_K$. Alternatively or in combination, the applications $411_1$ through $411_K$ may access session domain information directly.

Typically, the session contexts $402_1$ through $402_X$ and their associated session domains are essentially "cached" in the computing system's volatile semiconductor random access memory (e.g., within the computing system's system memory and/or the computing system's processors' caches) so that rapid accesses $406_1$ through $406_Y$ to the session state and/or session management criteria information can be made. As alluded to in the background, the cached ("in-memory") session state information may be persisted to a file system or database to prevent service disruption in case there is some operational failure that causes the cached session state information to no longer be accessible. Moreover, consistent with classical caching schemes, session state information that has not been recently used may be "evicted" to persistent storage to make room in the computing system memory for other, more frequently used objects. Thus, access to persistent storage for session information not only provides a "failover" mechanism for recovering from some type of operational crash, but also, provides a deeper storage reserve for relatively infrequently used session information so as to permit the computing system as a whole to operate more efficiently.

2.0 File System and Database Persistent Storage Interfaces

The session management layer 410 is responsible for managing the persistence of session objects consistently with the session management criteria that is defined for their respective session domains. Because of the different types of file systems that may exist, the syntax and/or command structure used to store and/or retrieve information to/from a particular file system may differ from that of another file system. Moreover, the types of activities that are performed on a file system with persisted information (most notably the storing and retrieving of persisted information) tend to be the same regardless of the actual type of file system that is implemented. That is, the high level operations performed on a file system with persisted information generally are independent of any particular file system.

In order to enable the straightforward configuration of a particular session domain whose content is to be persisted into a specific type of file system, some kind of easily configurable translation layer is needed whose functional role, after its instantiation and integration into the deployed software platform as a whole, is to interface between a set of high level persistence related commands and a specific type of file system. By so doing, source code level developers can develop the session management layer 410 and/or applications $411_1$ through $411_K$ that invoke persisted information be referring only to a high level command set.

Upon actual deployment of the executable versions of the source code, which approximately corresponds to the time at which the actual file system to be used for persistence is actually identifiable, the translation layer is instantiated to translate between these high level commands and the specific syntax and/or command set of the particular type of file system that is to be used to persist the data. According to one implementation, a unique block of translation layer code is instantiated for each session domain (i.e., each session domain is configured to have "its own" translation layer code). According to another implementation, a unique block of translation layer code is instantiated for each file system (i.e., each file system is configured to have "its own" translation layer code).

During actual runtime, in order to store/retrieve persisted information, the session management layer 410 and/or certain applications essentially "call on" a translation layer (through the high level command set) and use it as an interface to the translation layer's corresponding file system. For clarity, a translation layer as described just above will be referred to by the term "session persistence storage interface" or simply "persistence storage interface" or "persistence interface".

Figure 5:
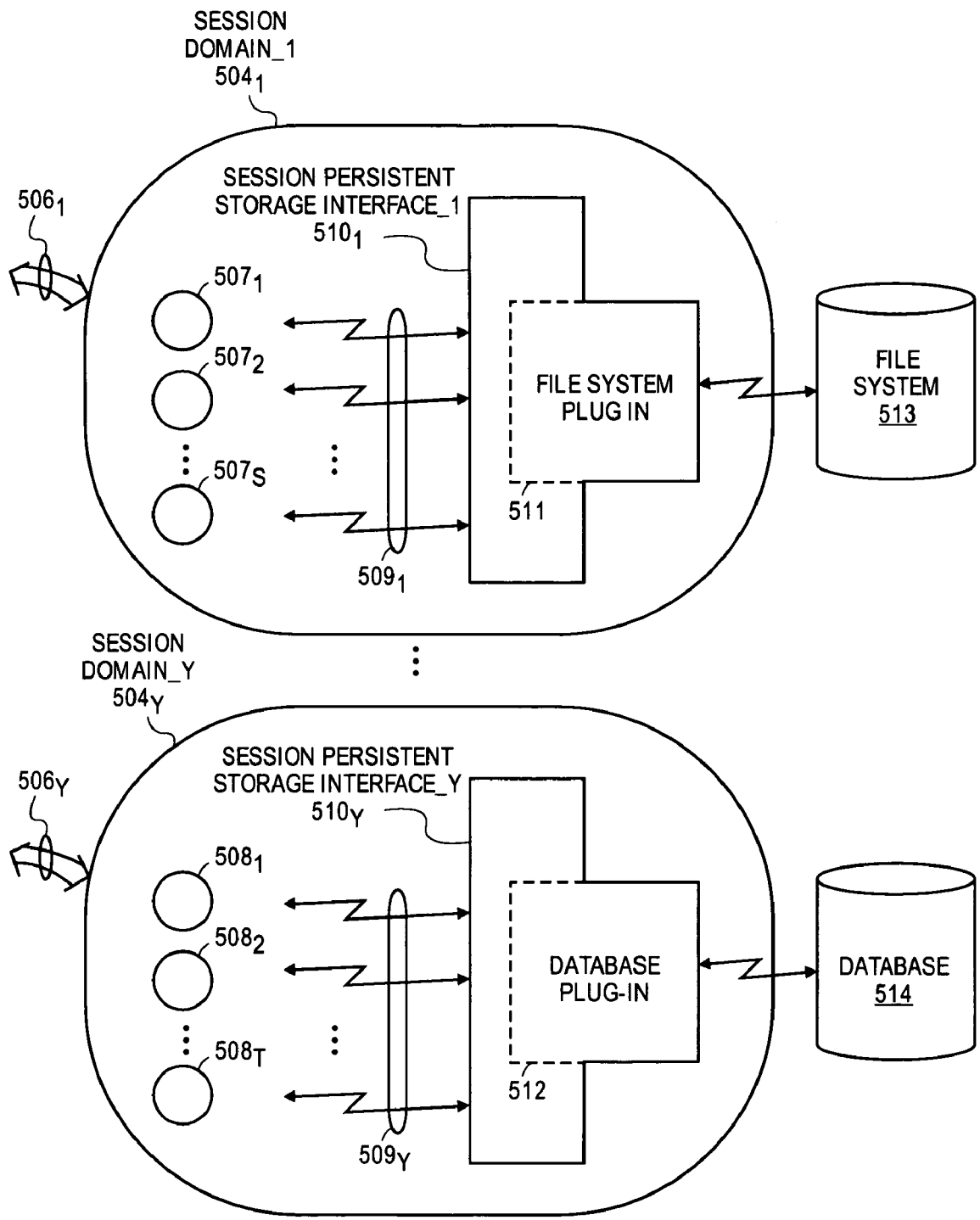

FIG. 5 shows persistence storage interface models for a file system and for an external database. Specifically, persistence storage interface $510_1$ is depicted as being an interface to a file system 513; and, persistence storage interface $510_Y$ is depicted as being an interface to external database 514. Persistence storage interface $510_1$ is depicted as being the persistence interface between cached session domain $504_1$ and file system 513. Persistence storage interface $510_Y$ is depicted as being the persistence interface between cached session domain $504_Y$ and external database 514. Here, note the similarity in nomenclature between FIGS. 4 and 5 with regard to session domains $404_{1,Y}$ and $504_{1,Y}$ suggesting that session domain $404_1$ of FIG. 4 could be configured to use file system $510_1$ as its persistent storage medium, and, that session domain $404_Y$ of FIG. 4 could be configured to use database 514 as its persistence storage medium.

Activities $506_1$ and $506_Y$ are meant to depict any activities stemming from the session management layer and/or any applications that are imparted upon session objects $507_1$ through $507_S$ and $508_1$ through $508_T$, respectively, and/or upon their respective session domains $504_1$, $504_Y$ as a whole. As described above, these activities $506_1$, $506_Y$ may involve method calls to the respective persistence storage interfaces $510_1$, $510_Y$. Here, activities $509_1$ and $509_Y$ are meant to depict the transfer of session state information between the cached session domain $504_1$, $504_Y$ and the corresponding persistence storage medium 513, 514.

Notably, the depicted persistence interface models $510_1$, $510_Y$ use a "plug-in" architecture. A "plug-in" is a pre-existing segment of code that is not integrated into a larger software system, ultimately as a working component of the larger software system, unless an affirmative command to integrate the plug-in into the larger system is made. According to an implementation, a separate plug-in exists for different types of persistence storage implementations that may exist. For example, currently, there are different types of file systems and databases available on the open market that a "user" of the software may choose to use for persistence purposes.

In the case of databases, different database software vendors presently exist such as Oracle, IBM and Microsoft. Each of these different vendors tend to have an SQL based command language (e.g., insert). Often times, different command statements are needed to perform identical operations across different database software implementations. Therefore, according to the approach of FIG. 5, a separate database plug-in 512 is written for the various types of "supported" persistence database solutions that an ultimate end user of the computing system's application software may choose to implement. For example, a first plug-in may exist for database software offered by Oracle (e.g., Oracle Database based products), a second plug-in may exist for database software offered by IBM (e.g., IBM DB2), and, a third plug-in may exist for database software offered by Microsoft (e.g., Microsoft SQL Server based products).

According to an approach, upon deployment of software to a particular computing system and surrounding infrastructure (i.e., when a particular type of database software being used for persistence is actually known), the plug-in 512 for a particular type of database software is integrated into the computing system's software. According to a further embodiment, a separate database software plug-in is "plugged in" (i.e., integrated into the computing system's software) for each session domain having persistence to a database. Here, if different session domains are configured to persistent to a same database, some queuing space may need to be implemented between the session domains' plug-ins and the database in order to handle quasi-simultaneous persistence operations made to the database from different session domains.

According to an alternate embodiment, a separate database plug-in is "plugged in" for each different database that is used for persistence (i.e., the persistence functions for different session domains that use the same database flow through the same plug-in). According to this implementation, some queuing space may need to be implemented between the plug-in for a particular database and the different session domains that persist to that database in order to handle quasi-simultaneous persistence operations made to the database.

According to another alternate embodiment, a separate database plug-in is "plugged in" for each different type of database that is used for persistence (i.e., the persistence functions for different session domains that use the same database command language (but perhaps different actual database instances) flow through the same plug-in). According to this implementation, some queuing space may need to be implemented between the plug-in for a particular database type and the different session domains that persist to that database type in order to handle quasi-simultaneous persistence operations made to the same type database. Moreover, additional queuing space may need to be implemented between the plug-in for a particular database type and the different actual instances of that database type that the session data is actually persisted to.

According to the approach of FIG. 5, a separate database plug-in 511 is written for the various types of "supported" file systems that a customer of the software may choose to persist to. Upon deployment of the software to a particular platform (again, when the particular type(s) of file system(s) being used for persistence is actually known), the plug-in 511 for a particular file system is integrated into the software. Consistent with the principles outline just above, file system plug-ins may be "plugged in" on a per session domain basis, a per file system basis, or, a per file system type basis. Separate plug-ins may be written for each of various vendor-specific or open sourced file systems.

According to an embodiment, each plug-in essentially serves as a translator that translates between a generic command set and the command set particular to a specific type of persistence. According to one implementation, the generic command set is not specific to any particular persistence type. Referring briefly back to FIG. 4, by designing the persistence commands called out by the session management layer 410 and/or applications $411_1$ through $411_K$ with the generic command set, after deployment and during runtime, the plug-in for a particular type of persistence will translate the generic commands from the session management and/or an applications into commands that are specific to the particular type of persistence that has been implemented (e.g., a particular type of file system or database). As such, ideally, the source code designers of the session management function and/or applications need not concern themselves with particular types of persistence or their corresponding command languages.

2.1 Embodiment of File System Persistent Storage Interface

Figure 6:
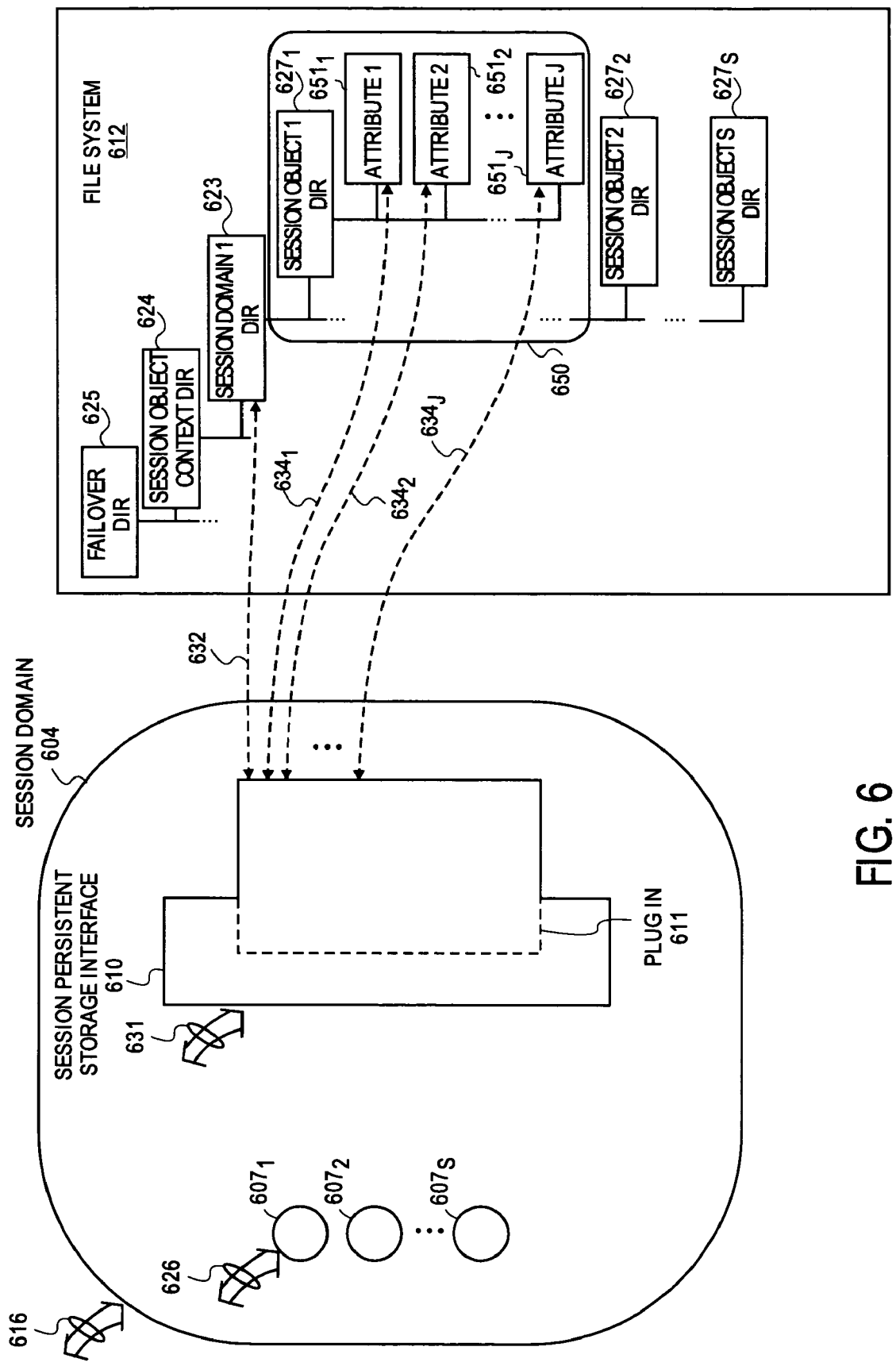
FIG. 6 shows an embodiment of the organization of a file system accessed through a file system persistent storage interface.
Figure 7:
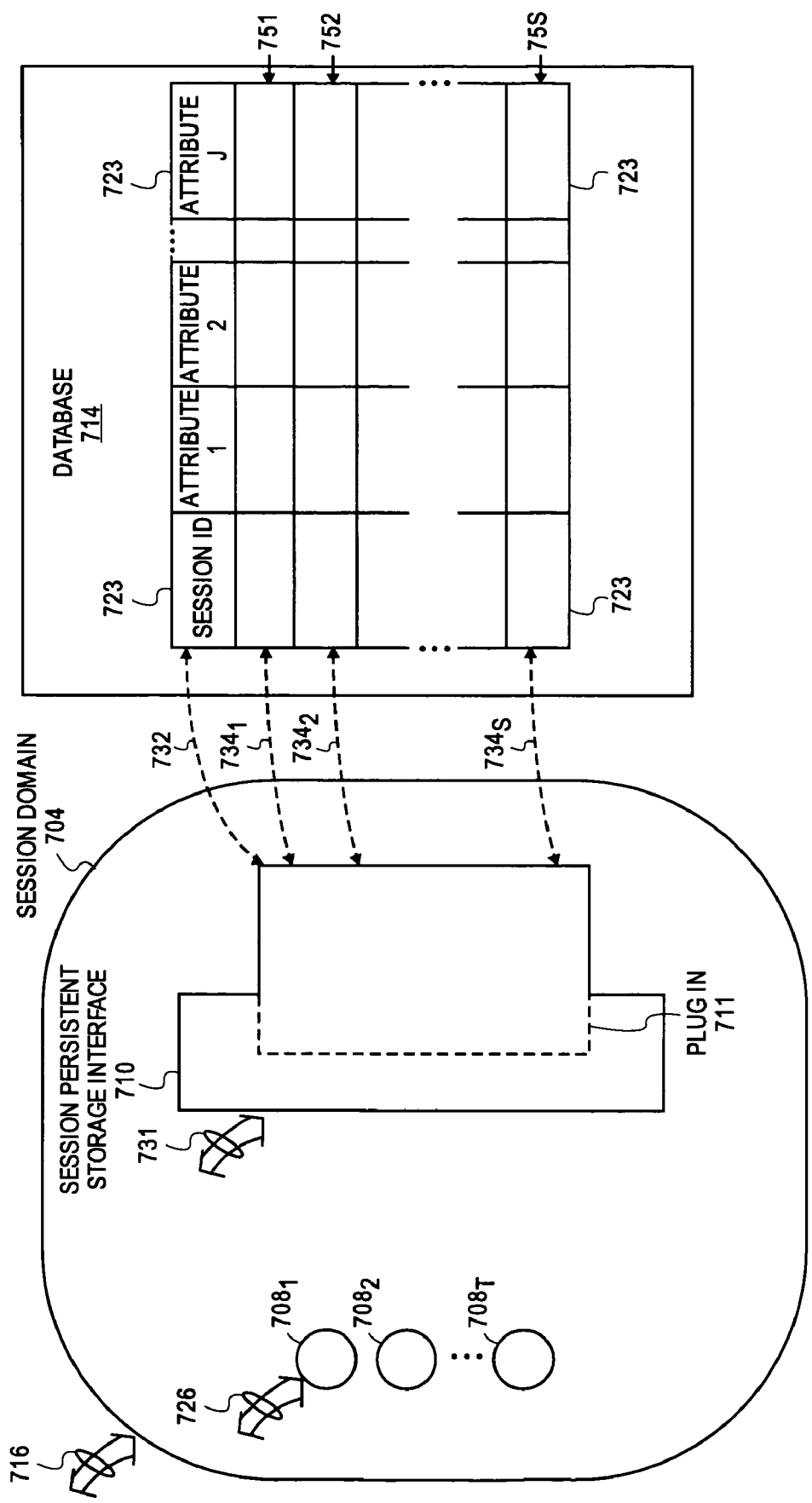
FIG. 7 shows an embodiment of the organization of a database accessed through a database persistent storage interface.

FIGS. 6 and 7 depict additional details about a persistent storage interface for a file system and database, respectively. Referring firstly to FIG. 6, activity 616 represents the activity that may be imposed upon the memory based session domain 604 by a session management layer and/or one or more applications; and, activity 626 represents the activity that may be imposed upon a specific session object (in particular, session object $607_1$) by a session management layer and one/or more applications. Here, because session domain 604 is configured to be "backed up" by persistent storage 613, note that, from a communicative flow perspective, a session persistent storage interface 610 containing plug-in code 611 resides between the session objects $607_1$ through $607_S$ and the file system persistence storage 613.

As described above with respect to FIG. 5, the persistence interface 610 comprehends a generic command set that the plug-in 611 is able to convert into commands that are specific to the particular type of file system that persistence storage 613 corresponds to (e.g., Linux based file systems (e.g., Ext, Ext2, Ext3), Unix based file systems (e.g., Unix Filing System (UFS), IBM based file systems (e.g., IBM Journaled File Systems (JFS), IBM General Parallel File System (GPFS)), Oracle based file systems (e.g., Oracle Clustered File System (OCFS), Oracle Real Application Clusters (RAC), Oracle Automatic Storage Management (OASM)), ReiserFS based files systems, Microsoft based file systems (e.g., FAT16, FAT32, NTFS, WINFS), etc.).

The application of the generic commands to the persistence storage interface 610 is represented as activity 631. Here, certain activity 616 applied to the session domain as a whole, as well as certain activity 626 applied to a specific session object, will trigger activity 631 at the persistent storage interface 610 so that the information and/or structure of the memory based session domain 604 is effectively duplicated with the persistent storage 613.

According to the perspective of FIG. 6, a "model" of a session object is persisted within the persistence storage 613. Because the particular persistent storage 613 of FIG. 6 is a file system, and because file systems tend to be organized through a hierarchy of directories that contain files having data, the persisted session object "model" of FIG. 6 corresponds to a set of files stored within a directory. As an illustrative example, FIG. 6 shows an exploded view of the specific model 650 that has been persisted for session object $607_1$. Here, a directory 627, has been created for session object $607_1$, and, the contents of this directory 627, include separate files $651_1$ through $651_J$ that, when taken together, correspond to the session information contained by session object $607_1$ that is persisted by file system 613. Note that separate directories $627_2$ through $627_S$ have been created for each of session objects $607_2$ through $607_S$, respectively.

The plug-in 611 is primarily responsible for, in response to the command activity 631 presented at the persistent storage interface 610, creating and deleting directories in the file system 613 and creating, deleting, reading and writing to files in the file system 613. According to one embodiment, the persistent storage interface 610 with its plug-in 611 causes the hierarchical structure of the directory that is persisted in the file system 613 to approximately mirror the hierarchical structure of the "in-memory" session domain 604. For example, referring to FIGS. 4 and 6, in the simplest case where the file system 613 is the sole persistence resource for session contexts $402_1$ through $402_X$, the persistence interface 610 with its plug-in 611 creates a failover directory 625 in the file system where all persisted session information is kept. Here, a separate directory is then established within the failover directory 625 for each session context $402_1$ through $402_X$ in the session domain (FIG. 6 only shows one such directory 624 which has been created for session context 624).

Within the directory for a particular context, directories are created for each session domain within the context. FIG. 6 only shows one such directory 623 created for session domain $404_1$, at least Y such directories would be created within context directory 624. The directory for a particular session domain, such as directory 623, contains a directory for each session object that is associated with the session domain. Thus, as observed in FIG. 6, a separate directory $627_1$ through $627_S$ exists for each of session objects $607_1$ through $607_S$, respectively. If session domain $404_1$ has any children session domains (not shown in FIG. 4), directory $627_1$ would contain additional directories for these children session domains (that, in turn, would contain directories for their corresponding session objects and children session domains).

Notably, the various contents of session object $607_1$ are broken down into separate "attributes", and, a separate file is created and stored in directory $627_1$ for each attribute of session object $607_1$ (or at least those attributes deemed worthy of persisting). According to the exemplary depiction of FIG. 6, session object $607_1$ has "J" different attributes that are persisted through files $651_1$ through $651_J$, respectively. An attribute generally corresponds to a specific item of data that is a component of a session's session state information. Generic examples of attributes include and the session's sessionID and expiration time. However, in practice, attributes tend to be specific to the particular information that is persisted for a particular session. For instance, in the case of a "session" Enterprise Java Bean (EJB) various "attributes" of session state information that are specific or unique to the EJB will be persisted.

According to one embodiment, the following set of generic commands may be presented at the session persistent storage interface 610 for purposes of managing the persisted session domain as a whole. Communicative flow 632 is meant to depict this high level management view. Input arguments for the command methods are presented in parenthesis.

1. Create_Model (sessionID). The "Create_Model" command creates a model for a specific directory in the file system 613 for a specific session. As described above, according to one implementation, a unique session object is created for each unique session. When the computing system recognizes a new session, a new session object is created for that session, a session domain for that session object is identified or created, and, the Create Model command is called at the persistent storage interface 610 for the session domain 604. In response to the Create Model command, the plug-in 611 creates a directory in the file system for the new session (e.g., directory 627$_1$) within the file system directory established for the session domain (e.g., directory 623). In an implementation, the plug-in 611 creates the directory though a "model" object that represents the new directory and contains "handlers" to the file system. For example, in the case of file system persistence, the model object keeps a reference to the java.ioFileOutputStream which is the object that provides the physical access to the file system. In one embodiment, the persistence storage interface 610 creates a mapping between the session object, the persistence model object and a specific directory in the file system 613. That is, in this embodiment a one-to-one correspondence exists between sessions within the session domain 604 and model objects managed by the persistent storage interface. As session data is modified, the mapping ensures that the session data stored within the file system remains consistent with the session object (i.e., via the file system handlers).

When a new session is created it is assigned an identification code—referred to as the "SessionID". Here, if per-session domain persistent storage interfaces are instantiated, the interface 610 need only be given the SessionID as the input argument in order to perform the appropriate operations upon the file system (assuming the interface 610 is configured to "know" as background information the identity of the file system it interfaces to as well as the session domain it services). The remainder of the commands below are described so as to apply to per-session domain persistent storage interfaces, but, the arguments given with the commands could be extended to include the identity of the session domain if persistence storage interfaces are instantiated per file system, or the identity of the session domain and a specific file system if per-file system type interfaces are instantiated.

2. Get_Model (sessionID). The "Get Model" command retrieves the entire persisted content for a session. Thus, for example, if the GetModel command where executed for the session for which directory 627$_1$ was created, the session model object of the plug-in 611 would read each of attribute files 651$_1$ through 651$_J$ from the file system.

3. Remove_Model (model). The "Remove Model" command essentially deletes the persisted information for a particular session. For example, if the Remove Model command were executed for the session for which directory 627$_1$ was created, the session model object of the plug-in 611 would delete directory 627$_1$ and all its contents from the (i.e., attribute files 651$_1$ through 651$_J$) from the file system. A Remove Model command is often executed for a session after the session has been deemed no longer functioning (e.g., "expired", "corrupted", etc.).

4. Iterator. The "Iterator" command is called so that specific attribute files mapped to model objects can be fetched from each session directory within the session domain directory. According to one implementation, in response to the Iterator command, the interface 610 creates and returns to the caller of the Iterator command an "Iterator" object. An iterator object, such as Java's java.util.Iterator interface object, is an object having methods to fetch some or all elements within a collection. Thus, for example, if the session management layer wanted to view the first attribute within each of session directories 627$_1$ through 627$_S$, it would first call the Iterator command at the persistence interface 610.

The interface 610 would then return an Iterator object to the session management layer in response. The session management layer could then use the Iterator object to fetch the first attribute within each session directory. According to one embodiment, the interface 610 creates the iterator object so that is it executes a sequence of "Get Attribute(s)" commands at the interface 610 (specifically, one "Get Attribute(s)" command for each session directory within the session domain directory), where, the desired attribute(s) are specified by the caller of the "Iterator" command. The Get Attribute(s) command is described in more detail further below.

5. Iterator_All_Expired. The "Iterator_All_Expired" command operates similarly to the Iterator command, except that the created Iterator object only has visibility into the session directories of sessions that are deemed expired. According to an implementation, execution of the Iterate_All_Expired function involves the interface 610 having to first identify those sessions that are deemed expired and then having to create an Iterator object whose sequence of Get Attribute(s) commands only read into those session directories identified as being expired. In order for the interface 610 to determine which sessions have expired, the session domain directory 623 can be configured to include information sufficient for the determination to be made.

For example, in one embodiment, one of the attributes within each session object and its corresponding persisted directory is the time at which the corresponding session is deemed to be expired. If the plug-in 611 reads this attribute and the present time is beyond the time recorded in the attribute, the session is deemed "expired" (accordingly, note that the plug-in 611 should write the expiration time for a session into the appropriate attribute of the session's corresponding session directory each time a new request is received for the session).

6. Remove_All_Expired. The "Remove_All_Expired" command is used to delete all session directories from a session domain directory whose corresponding sessions are deemed expired. Here, consistent with the discussion provided just above with respect to the Interator_All_Expired command, session directories can be identified as being expired if they are designed to contain an attribute that identifies them as being expired; or, if the session domain directory contains information sufficient for the interface 610 to determine which sessions are expired.

Whereas the above commands provide session domain-wide management functions for a persisted session domain, in a further embodiment, the interface 610 and model object of its plug-in 611 are also written to support the following command set for managing the information that is persisted for a particular session (e.g., for managing a particular model's information). Each of the commands below can be assumed to be identified to the interface 610, in some way, as pertaining to a particular session within the session domain.

1. Get_Session_ID. Execution of the Get_Session_ID command causes the plug-in 611 to read the sessions for the particular session that the command is called on behalf of. Note that, accordingly, the sessionID corresponds to information contained in one of the attributes associated with a session's persisted session state information.

2. Get_Expiration_Time. Execution of the Get_Expiration_Time command causes a model object of the plug-in 611 to read the expiration time for the particular session that the command is called on behalf of. Note that, accordingly, the expiration time corresponds to information contained in one of the attributes associated with a session's persisted session state information.

3. Update_Expiration_Time (maximum inactive time interval). Execution of the Get_Expiration_Time command causes the model object within the plug-in 611 to write a new expiration time for the particular session that the command is called on behalf of. According to one implementation, as observed above, the maximum inactive time interval is presented as an input argument for the Update_Expiration_Time command. Here, the expiration time is calculated by the interface 610 (or its plug-in 611) simply by adding the maximum inactive time interval to the present time.

In an embodiment, even though the maximum inactive time interval is more properly viewed as session management criteria information, the inactive time interval is "tagged along with" the expiration time or is recognized as its own separate attribute within the client's session state information. Typically, a new expiration time is calculated with each newly arriving request for a particular session (or, with each completed request/response cycle for a particular session).

Note that, according to an implementation, the "present time" used for calculating the expiration time is taken from a clock within the computing system. Although not entirely relevant for internal file systems, using a clock from an external persistence resource (such as an external database or RAID system) could cause unequal expiration treatment across different persistence resources if the clocks from the different persistence resources do not have identical core frequencies. Calculating the expiration time from the persistence interface 610 or plug-in 611 keeps the core frequency the same (i.e., a clock within the computing system is used) across all session irregardless of each session's particular persistence resource.

4. Get_Attribute(s) (attribute(s)). Execution of the Get_Attribute(s) command causes a model object within the plug-in 611 to read one or more specific attributes identified by the caller of the command (e.g., the session management layer or an application). The "attribute(s)" argument identifies the specific attribute(s) (i.e., specific file(s)) that are to be retrieved.

In an implementation each one of these attributes (as well as the sessionID and expiration time) can be obtained by explicitly calling for it in the attribute(s) argument of the Get_Attribute command. Moreover, as part of managing the visual presentation that is rendered on the client over the course of the session, the attributes of a session's session state information may also include fairly large graphics files. In this case, the session object is used to implement a kind of caching scheme for certain visual images that are to be displayed on the client over the course of the session.

It is in this respect that size management of a session object and its persisted information may become an issue. If a session object were to contain a number of such large graphics files, reading/writing all of its contents to/from persistence storage 613 as standard persistence accessing procedure would be inefficient. By granularizing a session object's content into smaller attributes, and by making these attributes separately accessible to/from persistent storage 613, a single large graphics file can be individually read from persistence storage only if the file is actually needed—for instance (i.e., large graphics files that are not needed are not identified in the attribute(s) input argument and remain in persisted storage).

Perhaps more importantly, if only a relatively small piece of session state information is actually needed (e.g., just the expiration time), only that small piece of session state information can be read from persistent storage (i.e., the retrieval of un-desired large graphics file is avoided). Hence, the ability to specifically target only certain portions of a persisted session object results in more efficient operation as compared to an environment where only the entire content of a session object's contents can be read from or written to persistence.

Note that, according to an implementation, all attributes are individually accessible—not just those used for the storage of graphics files. Here, communicative flows $634_1$ through $634_j$ are meant to convey the individual accessibility of each of persisted attributes $651_1$ through $651_S$. In an implementation alternative to that described above, only a singleton "attribute" is presented as an input argument and separate Get Attribute(attribute) commands have to be called to retrieve more than one attribute.

5. Put_Attribute(s)(attribute(s)). Execution of the Put_Attribute(s) command enables the writing of individual attributes into persistent storage via the model object consistent with the same principles outlined above for the Get_Attribute(s) command. Notably, in an implementation, execution of a Get_Attribute(s) or Put_Attribute(s) command does not involve serialization of the attribute data. Traditionally, persisted objects have been serialized (into a "byte array") prior to their being persisted so as to enable their transport across networks and/or enable their reconstruction (through a process referred to as deserialization) upon being recalled from persistent storage. Serialization and deserialization can be an inefficient, however, and accessing the attributes(s) in a non serialized format should eliminate inefficiencies associated with serialization/deserialization processes.

6. Get_Attribute(s)_Serialized(attributes(s)). Execution of the Get_Attribute(s)_Serialized command is essentially the same as the Get_Atribute(s) command described above, except that the persistence storage interface 610 (or model object within the plug-in 611) performs deserialization on attribute data read from persistent storage.

7. Put_Attribute(s)_Serialized(attributes(s)). Execution of the Put_Attribute(s)_Serialized command is essentially the same as the Put_Atribute(s) command described above, except that the persistence storage interface 610 (or model object within the plug-in 611) performs serialization on attribute data written to persistent storage.

According to one implementation, session management criteria information for a particular session domain (e.g., maximum inactive time interval, maximum number of outstanding requests, access policy, etc.) is kept in the in-memory session domain 604 separately from the session domain's session objects $607_1$ through $607_S$ (e.g., in another object not shown in FIG. 6); and, is persisted to a file in the session domain's directory 623 (also not shown in FIG. 6) along with the individual session directories $627_1$ through $627_S$. Recalling the discussion provided above in Section 1.0 near the onset of the discussion of FIG. 4, separating session management criteria information from session state information keeps the size of the session objects $607_1$ through $607_S$ (and the size of their corresponding persisted directories $627_1$ through $627_S$) beneath the size they would otherwise be if they were designed to include the session management criteria information themselves.

2.2 Embodiment of Database Persistent Storage Interface

FIG. 7 depicts additional details about a persistent storage interface for a database. Similar to FIG. 6, activity 716 of FIG. 7 represents the activity that may be imposed upon the memory based session domain 704 by a session management layer and/or one or more applications; and, activity 726 represents the activity that may be imposed upon a specific session object (in particular, session object $708_1$) by a session management layer and one/or more applications. Here, because session domain 704 is configured to be "backed up" by database 714, note that, from a communicative flow perspective, the persistent storage interface 710 containing plug-in code 711 resides between the session objects $708_1$ through $708_T$ and the persistence storage 714.

As described above with respect to FIGS. 5 and 6, the persistence interface 710 comprehends a generic command set that the plug-in 711 is able to convert into commands that are specific to the particular type of database that persistence storage 714 corresponds to. The application of the generic commands to the persistence storage interface 710 is represented as activity 731. Here, certain activity 716 applied to the session domain as a whole, as well as certain activity 726 applied to a specific session object, will trigger activity 731 at the persistent storage interface 610 so that the information and/or structure of the memory based session domain 704 is effectively duplicated with the persistent storage 714.

According to the perspective of FIG. 7, a "model" of a session object is persisted within the persistence storage 714. Because the particular persistent storage 714 of FIG. 7 is a database, and because database data tends to be organized with a table, the persisted session object "model" of FIG. 7 corresponds to a row within a table 723 that has been established for the session domain 704. As an illustrative example, FIG. 7 shows tables rows 751, 752, . . . 75S as being the persisted models for session objects $607_1$, $607_2$, . . . $607_S$, respectively. The different session object attributes correspond to different columns within the table 723.

For simplicity, the particular table 723 of FIG. 7 is drawn so as to only apply to session domain 704. In an implementation, table 723 is a segment of a larger table in database 714 whose organization reflects the hierarchy of an entire session domain context as observed in FIG. 4. For example, the first table column may be reserved to identify the context, the second table column may be reserved to identify the particular session domain within the session context (e.g., root/session_domain_1), and, the third table column may include the sessionID (which has been depicted as the first table column in FIG. 7). A row for a particular session is therefore accessible by matching on the first three columns in the table.

The plug-in 711 is primarily responsible for, in response to the command activity 731 presented at the persistent storage interface 710, creating and deleting rows in the table 723 as well as reading from and writing to the rows in the table 723. According to a further implementation, a similar table is created in the database for each in-memory session domain that is persisted to the database 714.

According to one embodiment, the following set of generic commands may be presented at the session storage interface 610 for purposes of managing the persisted session domain as a whole. Communicative flow 732 is meant to depict this high level management view. Input arguments for the command methods are presented in parenthesis. Note that, consistent with the discussion provided above with respect to FIG. 5, in order to provide different types of persistent storage transparently to higher layers of software within the computing system (e.g., a session management layer and/or one or more applications), the command set is identical to the command set discussed above in FIG. 6 with respect to file systems. The only difference is the operations performed by the corresponding plug-ins 611, 711.

1. Create_Model (sessionID). The "Create_Model" command creates a row in the database table 723 for a specific session. As described above, according to one implementation, a unique session object is created for each unique session. When the computing system recognizes a new session, a new session object is created for that session, a session domain for that session object is identified or created, and, the Create Model command is called at the persistent storage interface 710 for the session domain 704. In response to the Create Model command, the plug-in 711 (e.g., through a "model" object) creates a row in the table for the new session. When a new session is created it is assigned an identification code—referred to as the "SessionID". In one embodiment, the persistence storage interface 610 creates a mapping between the session object, the persistence model object for that session and a specific row in the database table 723. That is, in this embodiment a one-to-one correspondence exists between sessions within the session domain 604 and model objects managed by the persistent storage interface 610. As session data is modified, the mapping ensures that the session data stored within the database remains consistent with the session object.

Here, if per-session domain persistent storage interfaces are instantiated, the interface 710 need only be given the SessionID as the input argument in order to perform the appropriate operations upon the file system (assuming the interface 710 is configured to "know" as background information the identity of the database it interfaces to as well as the session domain it services). The remainder of the commands below are described so as to apply to per-session domain persistent storage interfaces, but, the arguments given with the commands could be extended to include the identity of the session domain if persistence storage interfaces are instantiated per database, or the identity of the session domain and a specific database if per-database type interfaces are instantiated.

2. Get_Model (sessionID). The "Get Model" command retrieves the entire persisted content for a session. Thus, for example, if the GetModel command where executed for the session for which row 751 was created, the model object within the plug-in 711 would read each of the J attribute files in row 751 from the database table 723.

Remove_Model(model). The "Remove Model" command essentially deletes the persisted information for a particular session. For example, if the Remove Model command were executed for the session for which row 751 was created, the model object within the plug-in 711 would delete row 751 from the database table 723. A Remove Model command is often executed for a session after the session has been deemed no longer functioning (e.g., "expired", "corrupted", etc.).

Iterator. The "Iterator" command returns an "Iterator" object having visibility into all rows in the database table 723. According to one embodiment, the interface 710 creates the iterator object so that it executes a sequence of "Get Attribute(s)" commands at the interface 710 (specifically, one "Get Attribute(s)" command for each row within the table 723), where, the desired attribute(s) are specified by the caller of the "Iterator" command. In this manner, the same one or more attributes can be retrieved from each row in the database table 723.

Iterator_All_Expired. The "Iterator_All_Expired" command operates similarly to the Iterator command, except that the created Iterator object only has visibility into the session directories of sessions that are deemed expired. According to an implementation, the interface 710 first identifies those sessions that are deemed expired and then creates an Iterator object whose sequence of Get Attribute(s) commands only read into those session directories identified as being expired. In order for the interface 710 to determine which sessions have expired, the session attributes can be configured to include information sufficient for the determination to be made.

For example, one of the attributes within each session object (and corresponding database table column) is the time at which the corresponding session is deemed to be expired. If the model object within the plug-in 711 reads this attribute and the present time is beyond the time recorded in the attribute, the session is deemed "expired" (accordingly, note that the model object within the plug-in 711 should write the expiration time for a session into the appropriate column of the session's corresponding session database table row each time a new request is received for the session).

Remove_All_Expired. The "Remove_All_Expired" command is used to delete all rows from a session domain's database table whose corresponding sessions are deemed expired. Here, consistent with the discussion provided just above with respect to the Interator_All_Expired command, session rows can be identified as being expired if they are designed to contain an attribute that identifies them as being expired; or, if the row attributes contains information sufficient for the interface 710 to determine which sessions are expired.

Whereas the above commands provide session domain-wide management functions for a persisted session domain, in a further embodiment, the interface 710 and the relevant model object within its plug-in 711 are also written to support the following command set for managing the information that is persisted for a particular session (i.e., for managing a particular row's information). Each of the commands below can be assumed to be identified to the interface 710, in some way, as pertaining to a particular session within the session domain.

Get_Session_ID. Execution of the Get_Session_ID command causes the model object within the plug-in 711 to read the sessionID for the particular session that the command is called on behalf of.

Get_Expiration_Time. Execution of the Get_Expiration_Time command causes the model object within the plug-in 711 to read the expiration time for the particular session that the command is called on behalf of.

3. Update_Expiration_Time (maximum inactive time interval). Execution of the Get_Expiration_Time command causes the plug-in 711 to write a new expiration time for the particular session that the command is called on behalf of. According to one implementation, as observed above, the maximum inactive time interval is presented as an input argument for the Update_Expiration_Time command. Here, the expiration time is calculated by the interface 710 (or the model object within its plug-in 711) simply by adding the maximum inactive time interval to the present time.

In an embodiment, even though the maximum inactive time interval is more properly viewed as session management criteria information, the inactive time interval is "tagged along with" the expiration time or is recognized as its own separate attribute within the client's session state information. Typically, a new expiration time is calculated with each newly arriving request for a particular session (or, with each completed request/response cycle for a particular session).

Get_Attribute(s) (attribute(s)). Execution of the Get_Attribute(s) command causes the model object within the plug-in 711 to read one or more specific attributes identified by the caller of the command (e.g., the session management layer or an application). The "attribute(s)" argument identifies the specific attribute(s) (i.e., specific table column(s)) that are to be retrieved. Typically, the attributes that are recorded should be largely if not completely independent of the type of persistent storage employed. Hence, the same set of attributes discussed above with respect to the Get_Attribute(s) command for file systems can be used for database persistence. For substantially the same reasons described above with respect to file system's, the ability to specifically target only certain portions of a persisted session object results in more efficient operation as compared to an environment where only the entire content of a session object's contents can be read from or written to persistence.

Note that, according to an implementation, all attributes are individually accessible—not just those used for the storage of graphics files. Here, communicative flows $734_1$ through $734_S$ are meant to convey the individual accessibility of each of the persisted attributes across the database table's row structure. In an implementation alternative to that described above, only a singleton "attribute" is presented as an input argument and separate Get Attribute(attribute) commands have to be called to retrieve more than one attribute.

Put_Attribute(s)(attribute(s)). Execution of the Put_Attribute(s) command enables the writing of individual attributes into persistent storage consistent with the same principles outlined above for the Get_Attribute(s) command. Notably, in an implementation, execution of a Get_Attribute(s) or Put_Attribute(s) command does not involve serialization of the attribute data.

Get_Attribute(s)_Serialized(attributes(s)). Execution of the Get_Attribute(s)_Serialized command is essentially the same as the Get_Atribute(s) command described above, except that the persistence storage interface 710 (or the model object within the plug-in 711) performs deserialization on attribute data read from persistent storage.

Put_Attribute(s)_Serialized(attributes(s)). Execution of the Put_Attribute(s)_Serialized command is essentially the same as the Put_Atribute(s) command described above, except that the persistence storage interface 710 (or the model object within the plug-in 711) performs serialization on attribute data written to persistent storage.

According to one implementation, session management criteria information for a particular session domain (e.g., maximum inactive time interval, maximum number of outstanding requests, access policy, etc.) is kept in the in-memory session domain 704 separately from the session domain's session objects $708_1$ through $708_S$ (e.g., in another object not shown in FIG. 7); and, is persisted to another table (also not shown in FIG. 7) in the session domain's persistent storage 723. Here, keeping the session management criteria separate from the session state attributes in table 723 should result in efficiencies and isolation from clocking issues similar to those described above with respect to the Update_Expiration_Time command for file system persistent storage.

3.0 Shared Closures

Figure 8:
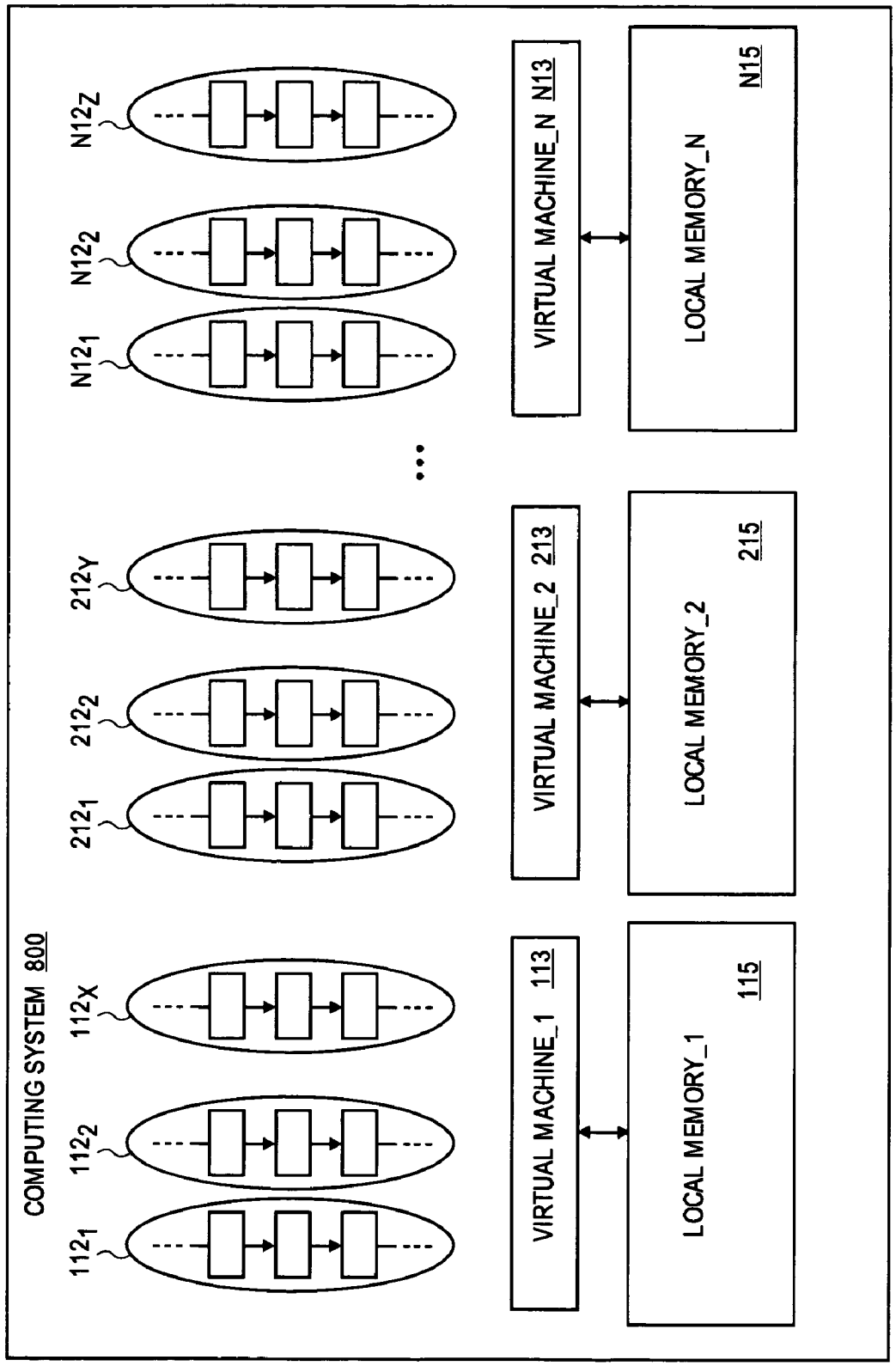
FIG. 8 (prior art) shows a prior art computing system.

FIG. 8 shows a prior art computing system 800 having N virtual machines 113, 213, . . . N13. The prior art computing system 800 can be viewed as an application server that runs and/or provides web applications and/or business logic applications for an enterprise (e.g., a corporation, partnership or government agency) to assist the enterprise in performing specific operations in an automated fashion (e.g., automated billing, automated sales, etc.).

The prior art computing system 800 runs are extensive amount of concurrent application threads per virtual machine. Specifically, there are X concurrent application threads ($112_1$ through $112_X$) running on virtual machine 113; there are Y concurrent application threads ($212_1$ through $212_Y$) running on virtual machine 213; . . . and, there are Z concurrent application threads ($N12_1$ through $N12_Z$) running on virtual machine N13; where, each of X, Y and Z are a large number.

A virtual machine, as is well understood in the art, is an abstract machine that converts (or "interprets") abstract code into code that is understandable to a particular type of a hardware platform. For example, if the processing core of computing system 800 included PowerPC microprocessors, each of virtual machines 113, 213 through N13 would respectively convert the abstract code of threads $112_1$ through $112_X$, $212_1$ through $212_Y$, and $N12_1$ through $N12_Z$ into instructions sequences that a PowerPC microprocessor can execute.

Figure 1:
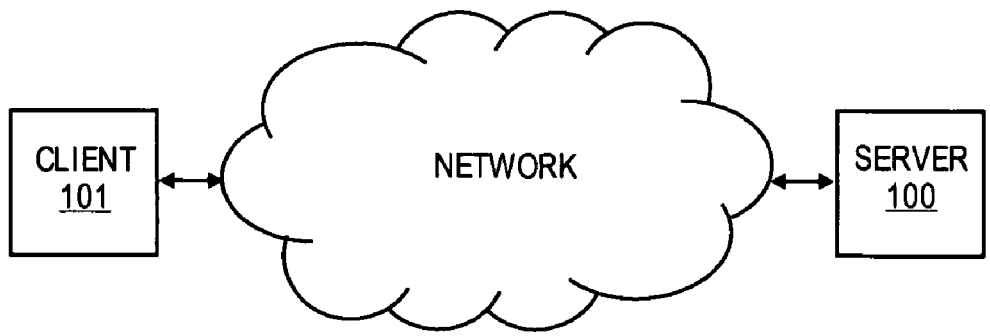
FIG. 1 (prior art) shows a network between a client and a server.
Figure 2:
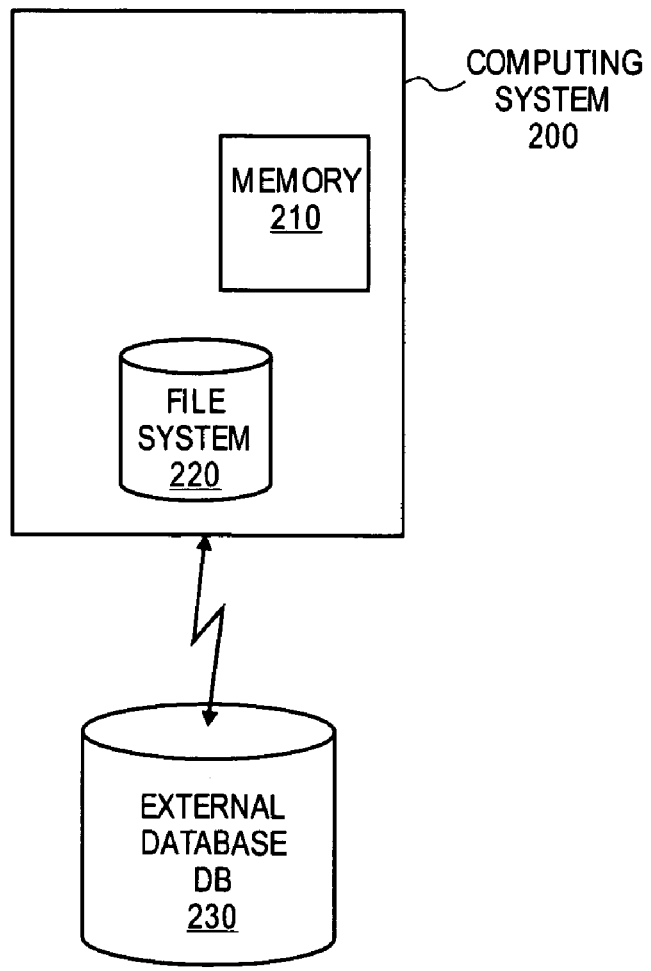
FIG. 2 (prior art) shows a computing system having internal memory and internal file system coupled to an external database.
Figure 3:
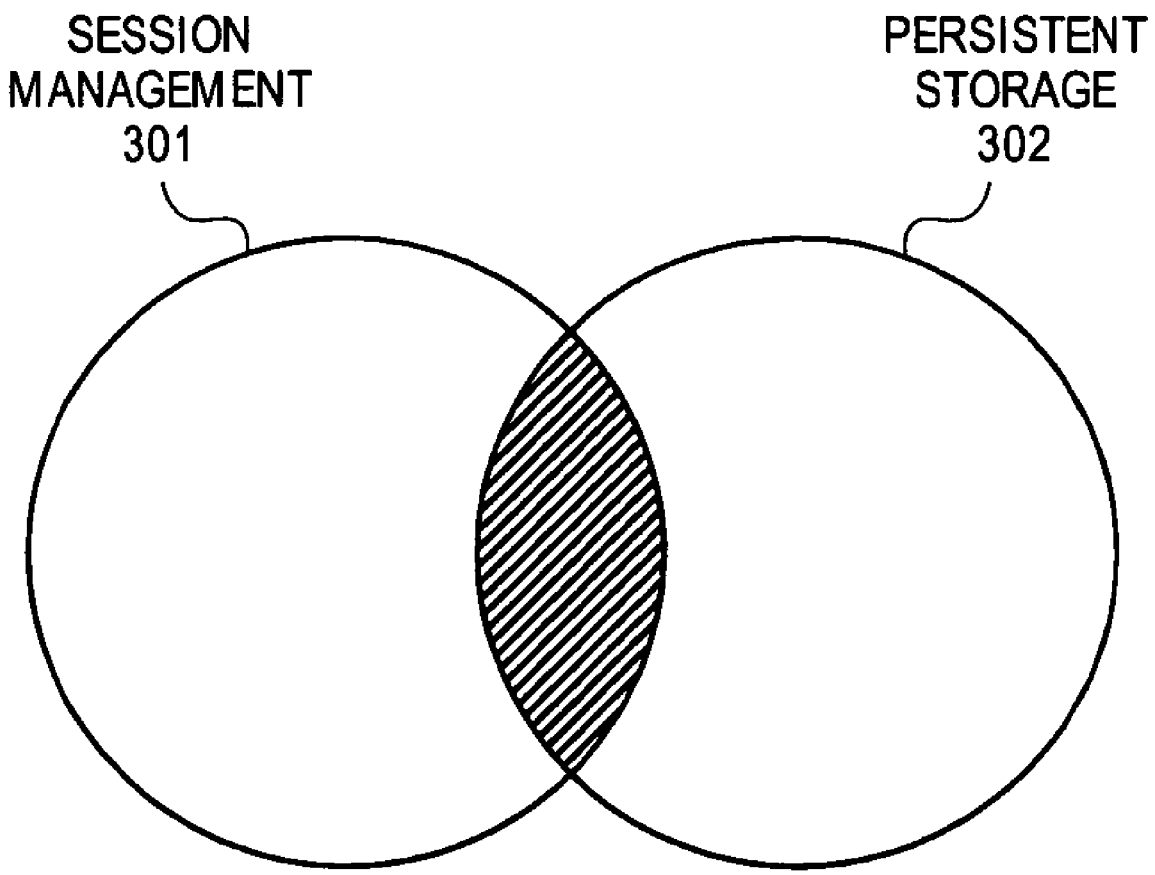
FIG. 3 shows that session management and persistence functions may overlap.

Because virtual machines operate at the instruction level they tend to have processor-like characteristics, and, therefore, can be viewed as having their own associated memory. The memory used by a functioning virtual machine is typically modeled as being local (or "private") to the virtual machine. Hence, FIG. 1 shows local memory 115, 215, N15 allocated for each of virtual machines 113, 213, . . . N13 respectively.

A portion of a virtual machine's local memory may be implemented as the virtual machine's cache. As such, FIG. 1 shows respective regions 116, 216, . . . N16 of each virtual machine's local memory space 115, 215, . . . N15 being allocated as local cache for the corresponding virtual machine 113, 213, . . . N13. A cache is a region where frequently used items are kept in order to enhance operational efficiency. Traditionally, the access time associated with fetching/writing an item to/from a cache is less than the access time associated with other place(s) where the item can be kept (such as a disk file or external database (not shown in FIG. 8)).

For example, in an object-oriented environment, an object that is subjected to frequent use by a virtual machine (for whatever reason) may be stored in the virtual machine's cache. The combination of the cache's low latency and the frequent use of the particular object by the virtual machine corresponds to a disproportionate share of the virtual machine's fetches being that of the lower latency cache; which, in turn, effectively improves the overall productivity of the virtual machine.

A problem with the prior art implementation of FIG. 8, is that, a virtual machine can be under the load of a large number of concurrent application threads; and, furthermore, the "crash" of a virtual machine is not an uncommon event. If a virtual machine crashes, generally, all of the concurrent application threads that the virtual machine is actively processing will crash. Thus, if any one of virtual machines 113, 213, N13 were to crash, X, Y or Z application threads would crash along with the crashed virtual machine. With X, Y and Z each being a large number, a large number of applications would crash as a result of the virtual machine crash.

Given that the application threads running on an application server 100 typically have "mission critical" importance, the wholesale crash of scores of such threads is a significant problem for the enterprise.

Figure 9:
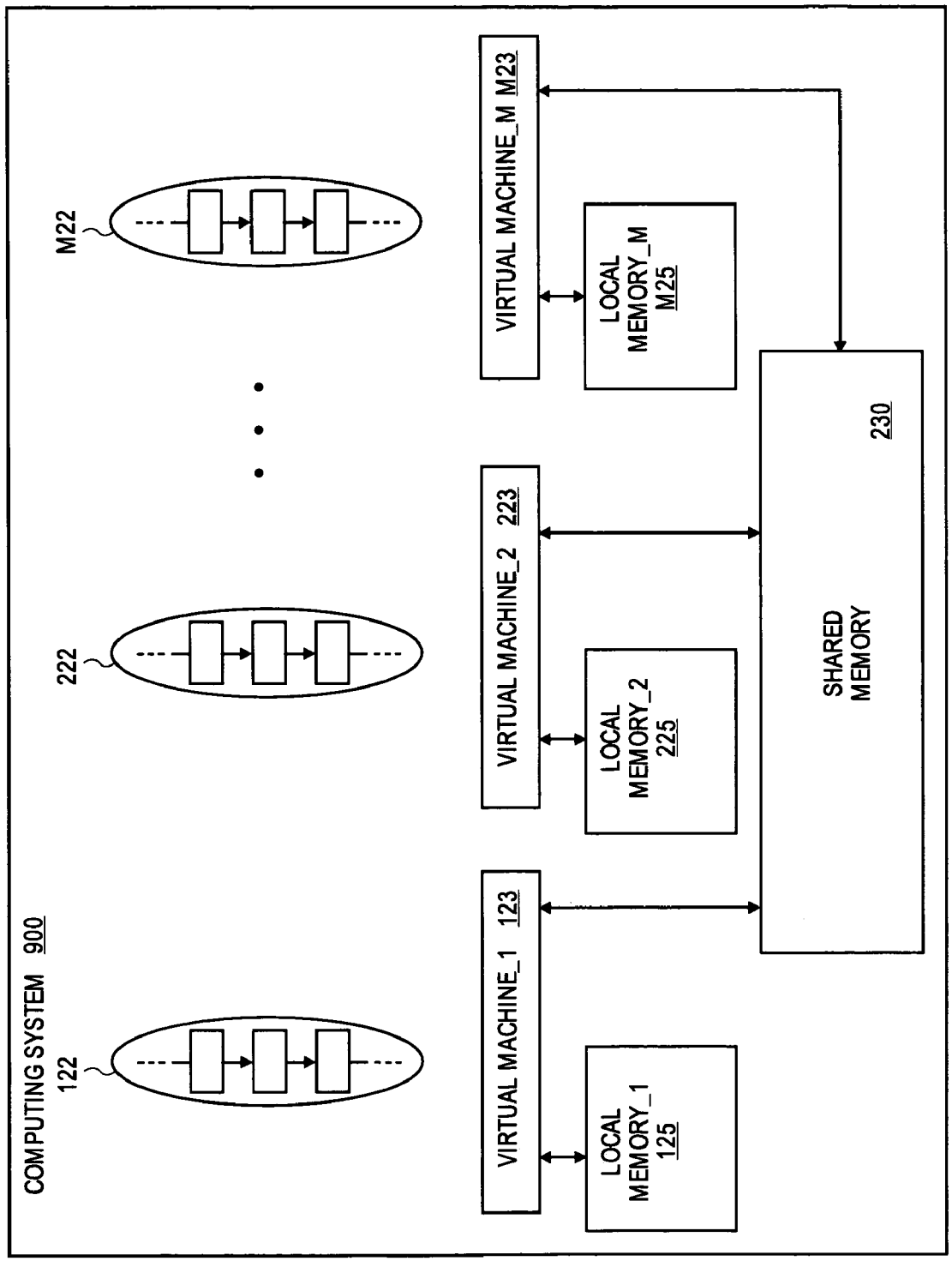
FIG. 9 shows an improved computing system that employs a shared memory that stores shared closures.

FIG. 9 shows a computing system 200 that is configured with less application threads per virtual machine than the prior art system of FIG. 8. Less application threads per virtual machine results in less application thread crashes per virtual machine crash; which, in turn, should result in the new system 200 of FIG. 9 exhibiting better reliability than the prior art system 800 of FIG. 8.

According to the depiction of FIG. 9, which is an extreme representation of the improved approach, only one application thread exists per virtual machine (specifically, thread 122 is being executed by virtual machine 123; thread 222 is being executed by virtual machine 223; . . . and, thread M22 is being executed by virtual machine M23). In practice, the computing system 200 of FIG. 9 may permit a limited number of threads to be concurrently processed by a single virtual machine rather than only one.

In order to concurrently execute a comparable number of application threads as the prior art system 800 of FIG. 8, the improved system 900 of FIG. 9 instantiates more virtual machines than the prior art system 800 of FIG. 8. That is, M>N.

Thus, for example, if the prior art system 800 of FIG. 8 has 10 application threads per virtual machine and 4 virtual machines (e.g., one virtual machine per CPU in a computing system having four CPUs) for a total of 4×10=40 concurrently executed application threads for the system 800 as a whole, the improved system 900 of FIG. 9 may only permit a maximum of 5 concurrent application threads per virtual machine and 6 virtual machines (e.g., 1.5 virtual machines per CPU in a four CPU system) to implement a comparable number (5×6=30) of concurrently executed threads as the prior art system 100 in FIG. 9.

Here, the prior art system 800 instantiates one virtual machine per CPU while the improved system 900 of FIG. 9 can instantiate multiple virtual machines per CPU. For example, in order to achieve 1.5 virtual machines per CPU, a first CPU will be configured to run a single virtual machine while a second CPU in the same system will be configured to run a pair of virtual machines. By repeating this pattern for every pair of CPUs, such CPU pairs will instantiate 3 virtual machines per CPU pair (which corresponds to 1.5 virtual machines per CPU).

Recall from the discussion of FIG. 8 that a virtual machine can be associated with its own local memory. Because the improved computing system of FIG. 9 instantiates more virtual machines than the prior art computing system of FIG. 8, in order to conserve memory resources, the virtual machines 123, 223, . . . M23 of the system 900 of FIG. 9 are configured with less local memory space 125, 225, . . . M25 than the local memory 115, 215, . . . N15 of virtual machines 113, 213, . . . N13 of FIG. 8. Moreover, the virtual machines 123, 223, . . . M23 of the system 900 of FIG. 9 are configured to use a shared memory 230. Shared memory 230 is memory space that contains items that can be accessed by more than one virtual machine (and, typically, any virtual machine configured to execute "like" application threads that is coupled to the shared memory 230).

Thus, whereas the prior art computing system 800 of FIG. 8 uses fewer virtual machines with larger local memory resources containing objects that are "private" to the virtual machine; the computing system 900 of FIG. 9, by contrast, uses more virtual machines with less local memory resources. The less local memory resources allocated per virtual machine is compensated for by allowing each virtual machine to access additional memory resources. However, owing to limits in the amount of available memory space, this additional memory space 230 is made "shareable" amongst the virtual machines 123, 223, ... M23.

According to an object oriented approach where each of virtual machines 123, 223, ... N23 does not have visibility into the local memories of the other virtual machines, specific rules are applied that mandate whether or not information is permitted to be stored in shared memory 230. Specifically, to first order, according to an embodiment, an object residing in shared memory 230 should not contain a reference to an object located in a virtual machine's local memory because an object with a reference to an unreachable object is generally deemed "non useable".

That is, if an object in shared memory 230 were to have a reference into the local memory of a particular virtual machine, the object is essentially non useable to all other virtual machines; and, if shared memory 230 were to contain an object that was useable to only a single virtual machine, the purpose of the shared memory 230 would essentially be defeated.

In order to uphold the above rule, and in light of the fact that objects frequently contain references to other objects (e.g., to effect a large process by stringing together the processes of individual objects; and/or, to effect relational data structures), "shareable closures" are employed. A "closure" is a group of one or more objects where every reference stemming from an object in the group that references another object does not reference an object outside the group. That is, all the object-to-object references of the group can be viewed as closing upon and/or staying within the confines of the group itself. Note that a single object without any references stemming from it can be viewed as meeting the definition of a closure.

If a closure with a non shareable object were to be stored in shared memory 230, the closure itself would not be shareable with other virtual machines, which, again, defeats the purpose of the shared memory 230. Thus, in an implementation, in order to keep only shareable objects in shared memory 230 and to prevent a reference from an object in shared memory 230 to an object in a local memory, only "shareable" (or "shared") closures are stored in shared memory 230. A "shared closure" is a closure in which each of the closure's objects are "shareable".

A shareable object is an object that can be used by other virtual machines that store and retrieve objects from the shared memory 230. As discussed above, in an embodiment, one aspect of a shareable object is that it does not possess a reference to another object that is located in a virtual machine's local memory. Other conditions that an object must meet in order to be deemed shareable may also be effected. For example, according to a particular Java embodiment, a shareable object must also posses the following characteristics: 1) it is an instance of a class that is serializable; 2) it is an instance of a class that does not execute any custom serializing or deserializing code; 3) it is an instance of a class whose base classes are all serializable; 4) it is an instance of a class whose member fields are all serializable; 5) it is an instance of a class that does not interfere with proper operation of a garbage collection algorithm; 6) it has no transient fields; and, 7) its finalize ( ) method is not overwritten.

Exceptions to the above criteria are possible if a copy operation used to copy a closure into shared memory 230 (or from shared memory 230 into a local memory) can be shown to be semantically equivalent to serialization and deserialization of the objects in the closure. Examples include instances of the Java 2 Platform, Standard Edition 1.3 java.lang.String class and java.util.Hashtable class.

A container is used to confine/define the operating environment for the application thread(s) that are executed within the container. In the context of J2EE, containers also provide a family of services that applications executed within the container may use (e.g., (e.g., Java Naming and Directory Interface (JNDI), Java Database Connectivity (JDBC), Java Messaging Service (JMS) among others).

Different types of containers may exist. For example, a first type of container may contain instances of pages and servlets for executing a web based "presentation" for one or more applications. A second type of container may contain granules of functionality (generically referred to as "components" and, in the context of Java, referred to as "beans") that reference one another in sequence so that, when executed according to the sequence, a more comprehensive overall "business logic" application is realized (e.g., stringing revenue calculation, expense calculation and tax calculation components together to implement a profit calculation application).

It should be understood that the number of threads that a virtual machine in the improved system of FIG. 9 can concurrently entertain should be limited (e.g., to some fixed number) to reduce the exposure to a virtual machine crash. For example, according to one implementation, the default number of concurrently executed threads is 5. In a further implementation, the number of concurrently executed threads is a configurable parameter so that, conceivably, for example, in a first system deployment there are 10 concurrent threads per virtual machine, in a second system deployment there are 5 concurrent threads per virtual machine, in a third system deployment there is 1 concurrent thread per virtual machine. It is expected that a number of practical system deployments would choose less than 10 concurrent threads per virtual machine.

3.1 Shared Memory "Persistence" with Shared Closures

With respect to the improved computing system 900 of FIG. 9, note that the shared memory 230 can be used as a persistence layer for computing system 900 that provides for failover protection against a virtual machine crash. That is, if session domain information for a particular session is "persisted" into shared memory 230 as a shared closure and a virtual machine within system 900 that has been assigned to handle the session crashes, another virtual machine within system 900 can "pick-up" the session because of its access to the session information in shared memory 230. Aspects of session handling and failover protection in shared closure/shared memory environments have already been described in U.S. patent application Ser. No. 11/024,924, filed, Dec. 28, 2004, entitled, "Failover Protection From A Failed Worker Node In A Shared Memory System," by Christian Fleischer; Galin Galchev; Frank Kilian; Oliver Luik; and Georgi Stanev; U.S. patent application Ser. No. 11/025,525, filed Dec. 28, 2004, entitled, "Connection Manager That Supports Failover Protection," by Christian Fleischer and Oliver Luik; U.S. patent application Ser. No. 11/025,514, filed Dec. 28, 2004, entitled, "API For Worker Node Retrieval Of Session Request," by Galin Galchev; U.S. patent application Ser. No. 11/024,552, filed Dec. 28, 2004, entitled, "System And Method For Serializing Java Objects Over Shared Closures," by Georgi Stanev; and U.S. patent application Ser. No. 11/025,316, filed Dec. 28, 2004, entitled, "System And Method For Managing Memory Of Java Objects," by Georgi Stanev. All of which are assigned to the assignee of the present application.

Storing session information in shared memory as its primary storage area results in an overlap between both the "in memory" and "persistence" storage concepts. That is, if session information is stored in shared memory 230 as its primary storage area, the computing system 900 should enjoy both the speed of "in memory" storage and internal failover protection offered by internal "persistent" storage. As described in more detail below, in case failover protection is desired outside the computing system 900 (so that another computing system can "pick up" a session dropped by system 900), the session information can also be persisted to an external persistent storage resource (e.g., database, RAID system, tape drive, etc.).

Figure 10:
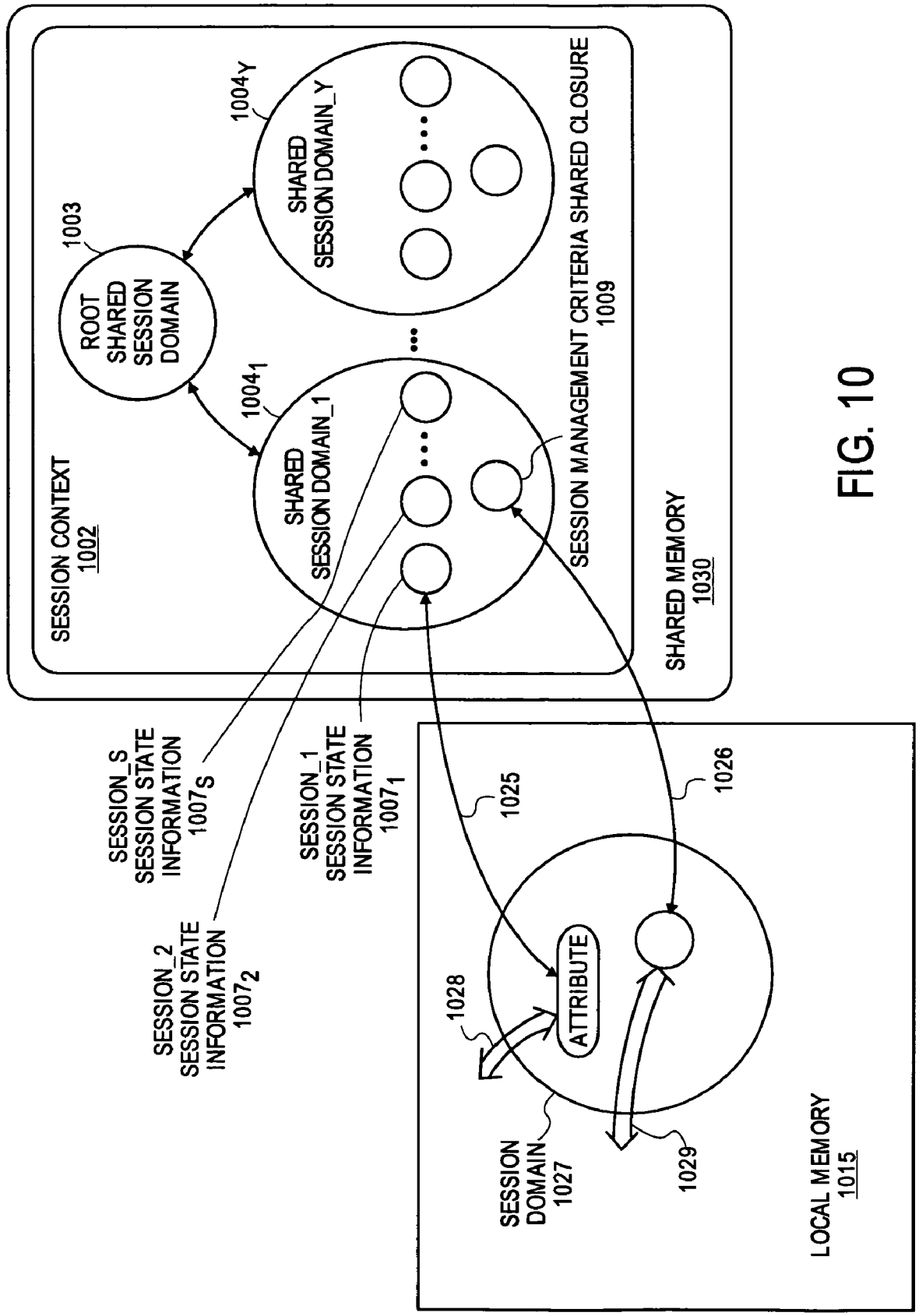
FIG. 10 shows a shared session context within a shared memory.

FIG. 10 shows an approach in which the "in-memory" session domain hierarchy scheme described with respect to FIG. 4 is essentially implemented within a shared closure based shared memory 1030. Here, the features of the shared memory context 1002, root 1003 and session domains 1004$_1$ through 1004$_Y$ may be the same as those described with respect to the context 402, root 403 and session domains 404$_1$ through 404$_Y$ described with respect to FIG. 4. It is worth noting that the hierarchical session domain approach described with respect to FIG. 4 may not only be implemented within the shared memory of a computing system that embraces shared closure/shared memory technology (as described with respect to FIG. 9), but also may be implemented within the local memory of a virtual machine in a prior art computing system that does not embrace shared closure/shared memory technology (as described with respect to FIG. 8).

FIG. 10 shows each of items 1007$_1$ through 1007$_S$ as containing session state information. Because each of the session domains 1003 and 1004$_1$ through 1004$_Y$ observed in FIG. 10 are accessible to multiple virtual machines (making their contents shareable to the virtual machines), FIG. 10 likewise refers to these session domains as "shared" session domains.

According to one approach, a persistent storage interface is not needed for access to the contents of a shared session domain in shared memory 1030 because the contents essentially reside "in-memory" (i.e., are accessible with a proper memory address). Similar to the Get_Attribute(s) command available for file system and database persistent storages, individual attributes of a particular session are individually accessible from shared closure shared memory as well (e.g., transfer 1025 shows a single attribute of user data 1007$_1$ being read into local memory). According to one embodiment, a hash-mapping function is used to directly access a specific attribute from a specific session's session state information. Here, the hash-mapping function employs a namespace in which the name of the session and the name of the desired attribute are used to uniquely identify the particular attribute in shared memory.

The ability to fetch attributes individually from shared memory 1030 should result in efficiency gains like those described above with respect to the Get_Attribute(s) command for file systems and databases. For example, if the session management layer (or an application) needs just the expiration time, only the expiration time is read from shared memory 1030 into local memory 1015. Undesired large graphics files (for instance) within the session state information are not transferred (i.e., remain in shared memory 1030) which corresponds to conservation of computing system resources.

Note that a virtual machine typically "runs" off of local memory. A running session management or application routine therefore runs off of local memory as well (through a virtual machine). When a certain object existing in shared memory as its own shared closure (i.e., the object does not contain a reference to another object in shared memory nor is referenced by another object in shared memory) is needed by a running process, it is called into the local memory of the virtual machine running that process. Here, activity 1028 is meant to depict the use of a session state attribute read into local memory 1015 from shared memory 1030.

Figure 11A:
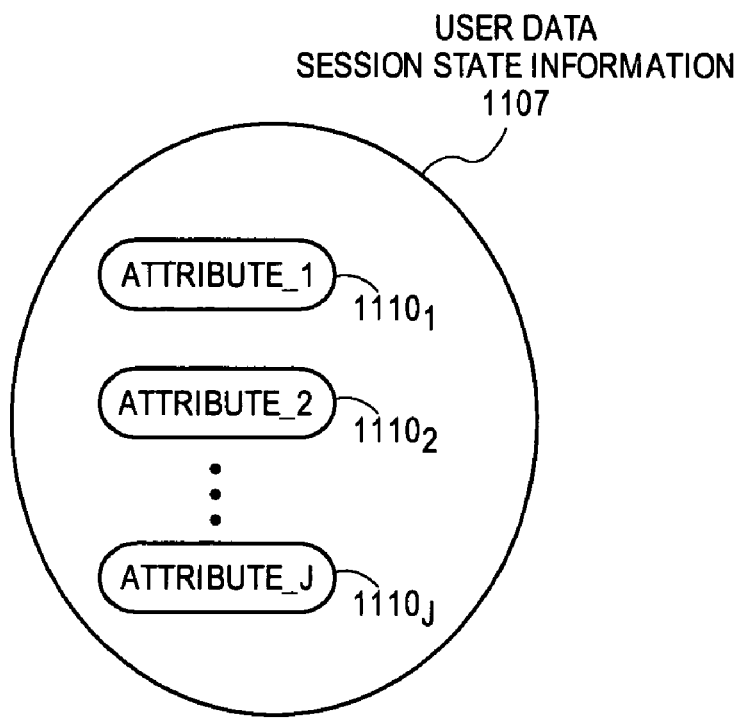
FIG. 11a shows an embodiment of a session state shared closure.

FIG. 11$a$ shows a depiction of session state information 1107 as stored in shared closure shared memory for a single session. For instance, session state information 1107 of FIG. 11 can be viewed as a deeper view of the contents of session state information 1007$_1$ of FIG. 10. Consistent with the file system and database persistence strategies, FIG. 11 shows the session state information for a particular session as being broken down into J separately accessible attributes 1110$_1$ through 1110$_J$. In an implementation, in order to make the attributes separately accessible and to be consistent with shared closure semantics, each attribute corresponds to its own shared closure (e.g., one object per attribute where no attribute object contains a reference to another attribute object). Note that a session domain 1027 may be established in local memory 1015 for session data associated with shared session domain 1004$_1$ (i.e., session domains may be setup in local memory 1015 having a one-to-one correspondence with shared session domains that reside in shared memory).

Discussed at length above was the notion that more efficient operations may be realized if session management criteria information is persisted separately from session state information (see the end of sections 2.1 and 2.2 above, respectively). FIG. 10 shows a shared closure 1009 within session domain 1004$_1$ that contains session management criteria information for the shared session domain 1004$_1$. Here, transfer 1026 is meant to show that the session management criteria (through shared closure 1009) can be transferred separately from session state information between shared memory 1030 and local memory 1015 so that, for instance, implementation of session management policies can be run from local memory 1015 without requiring session state information to be transferred between local and shared memory. Activity 1029 is meant to depict the use of session management criteria information read into local memory from shared memory 1030.

FIG. 11$b$ shows a detailed embodiment of a session management criteria shared closure 1109 (such as session management criteria shared closure 1009 of FIG. 10). As observed in FIG. 11$b$, the shared closure 1109 includes both an expiration management table 1120 and the session domain's session management criteria 1124 (e.g., maximum inactive time interval, maximum number of outstanding requests, access policy, etc.). Because of unique functional opportunities that exist as an artifact of having a shared memory approach, as described in more detail further below, the expiration management table 1120 allows any modification to one of a session domain's sessions (e.g., attribute modification to an existing session, addition of a new session, deletion of a completed session) to be used as a trigger to identify and drop all expired sessions within that session domain.

In one embodiment, the table 1120 is contained by a single object. In further embodiments, the table's object does not refer to nor is referenced by any objects associated with the session management criteria 1124 (or other object outside the table) and hence does not form part of a shared closure with the session management criteria (or other object). As such, the object containing table 1120 can be read in and out of shared memory as its own shared closure. In another embodiment, the table 1120 is implemented as a collection of objects in the form of a shared closure.

Figure 11B:
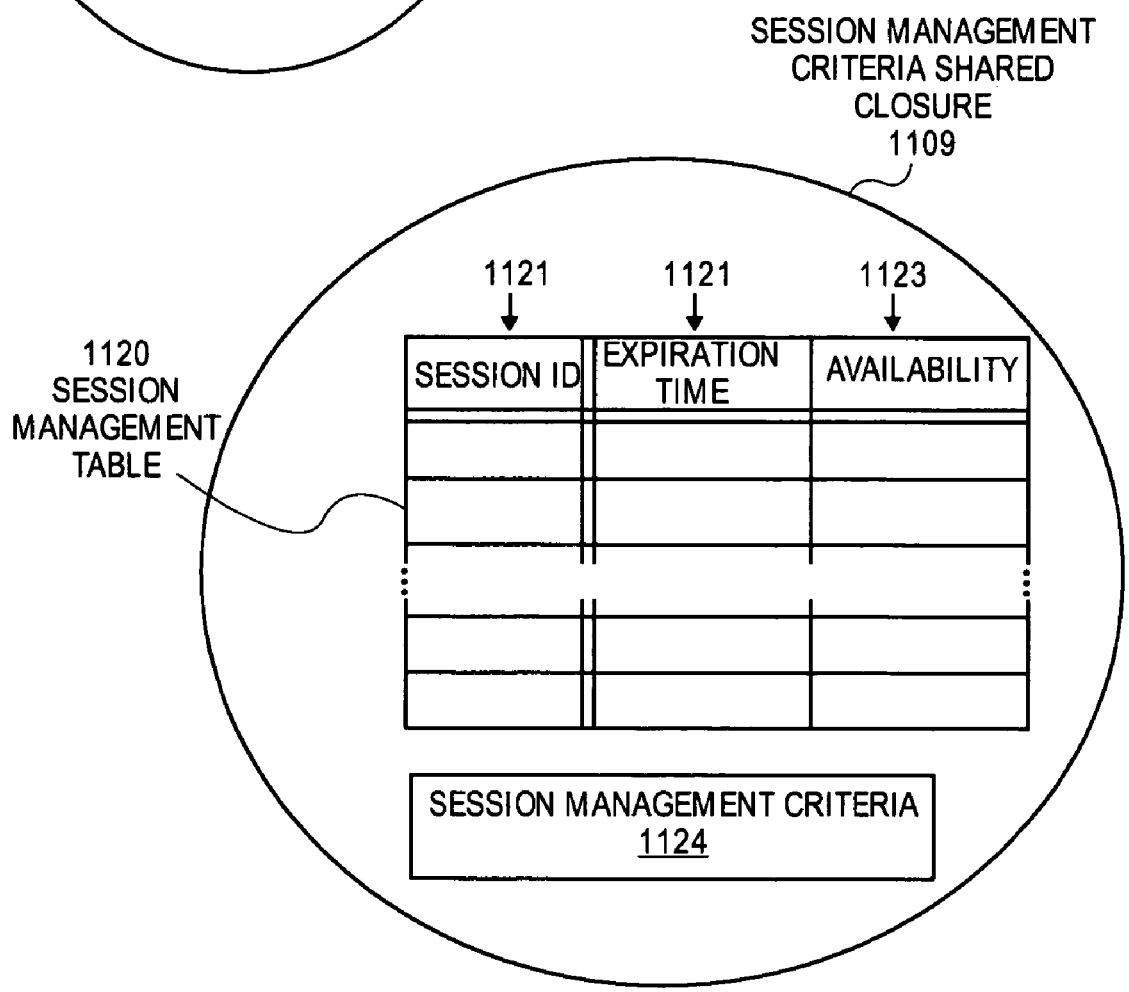
FIG. 11b shows an embodiment of a session management criteria shared closure.

As seen in FIG. 11$b$, the session management table may be configured to include the expiration time 1122 for each session in the session management table's corresponding session domain (where each session is identified by its sessionID 1121). Here, a table can be viewed as a data structure having an ordered design in which an item of a certain type of data belongs in a certain region within the data structure. FIGS. 12, 13, 14, and 15*a,b,c* demonstrate different operational flows employing a session management table (such as table 1120 of FIG. 11*b*) that may be used to perform session management tasks for the sessions associated with a session domain. Each of these flows are discussed in secession immediately below.

Figure 12:
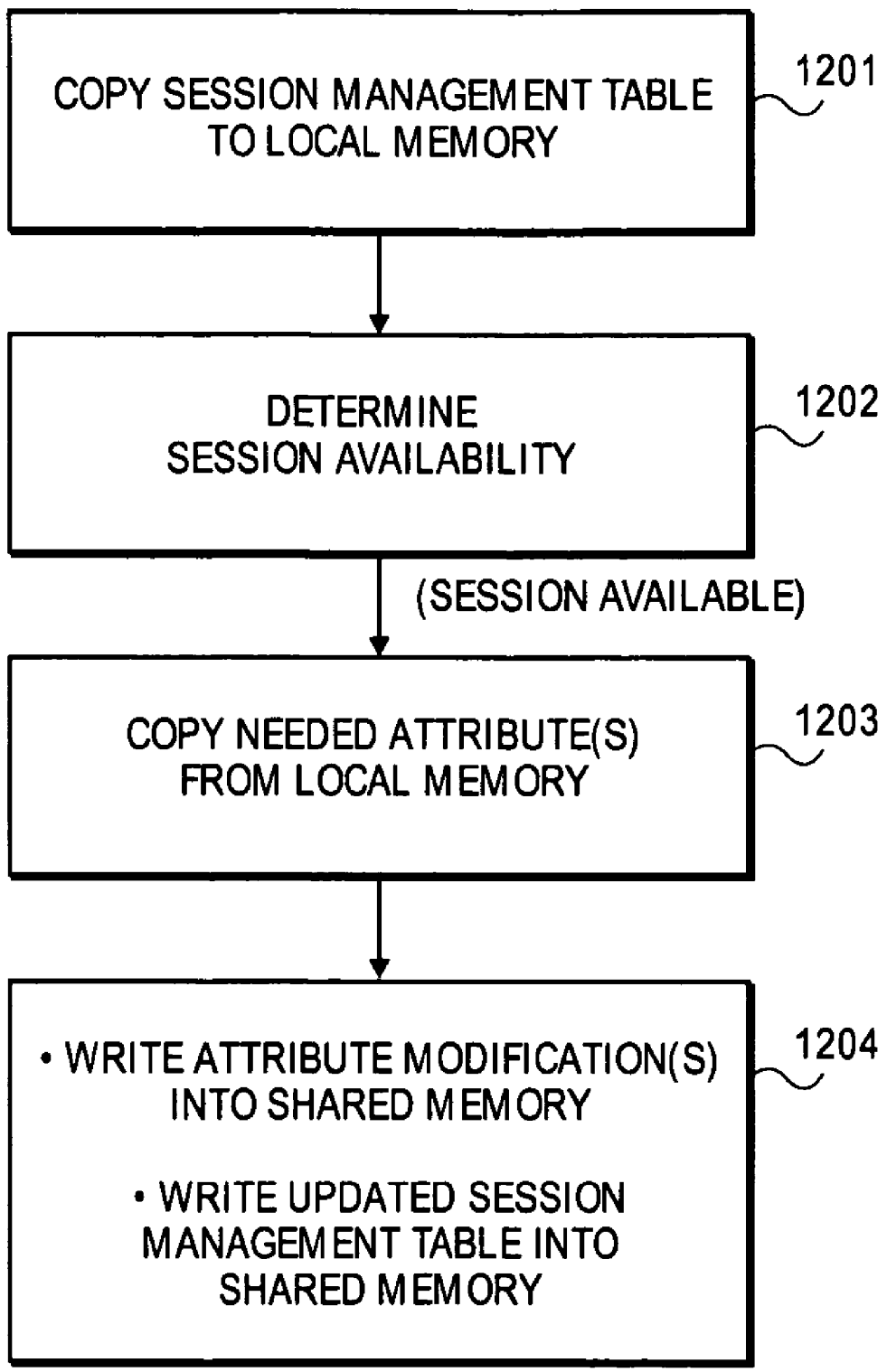
FIG. 12 shows a process for accessing session state attributes from shared memory.

FIG. 12 shows an operational flow for the processing of a request for an already established, existing session. According to the flow diagram of FIG. 12, when a process being run by a virtual machine processes a request for a session, the session management table from that session's session domain is first copied 1201 into the local memory of the virtual machine. Note that, referring back to the session management table embodiment 1120 of FIG. 11*b*, the table may also include a column 1123 that identifies, for each session in the session domain, whether or not the session is "available". According to one implementation, certain types of sessions are "distributed" which means that more than one virtual machine is able to process a request. If different requests from a same session are distributed to different virtual machines it is possible at least in some circumstances that a first virtual machine may be actively processing a first request while a second virtual machine attempts to process a second request from the same session.

The available column 1123 is used to specify whether or not a session is already being "dealt with" elsewhere (e.g., by another virtual machine). Thus, according to FIG. 12, after the table is copied into local memory 1201, the available column for the session that the virtual machine running off of the local memory ("the local virtual machine") is attempting to process a request for is checked to see if the session is available 1202. If a session is currently being handled by another virtual machine (i.e., the session is unavailable), the local virtual machine will find some kind of affirmative indication in the availability column and will delay its attempt to process the request at a later time (in which case an updated session management table having an updated expiration time will be copied into local memory).

If the session is not currently being handled by another virtual machine (i.e., the session is available), the local virtual machine will find some affirmative indication in the availability column, and then update shared memory to include a session management table showing that the session is now unavailable (i.e., the local virtual machine causes the available column for the session in shared memory to be marked as being unavailable). The virtual machine will then process the session's request which may involve the modification 1203 of various attributes associated with the session (such as the addition, deletion or modification of large graphics files, updating the state of the client's web browser, etc.).

Here, as described with respect to FIG. 10, any specific already existing attributes that need to be used or modified may be directly copied into local memory from shared memory 1025 without copying over any unwanted/unneeded attributes. Upon completion of the processing of the session's request one or more of the attributes that were copied into local memory may have been modified (or a new attribute may have been created). If so, the new attribute information is written into the session's session state shared closure; and, the session management table that resides in local memory is modified to reflect the new expiration time for the session (by adding the maximum inactive time interval to the present time) and that the session is now "available", and then, is written into the shared memory 1204.

Figure 13:
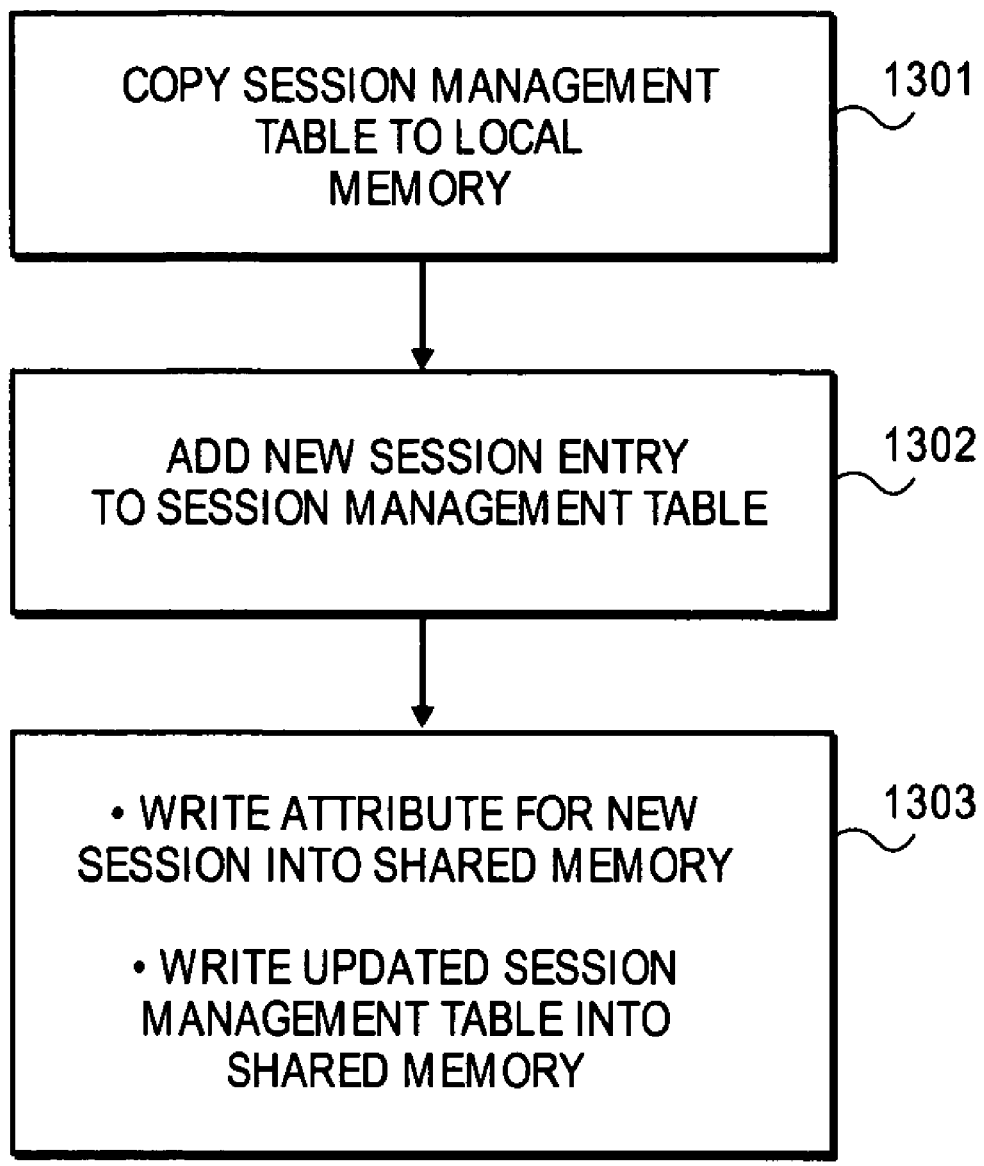
FIG. 13 shows a process for adding a session to a session management table stored in shared memory.
Figure 14:
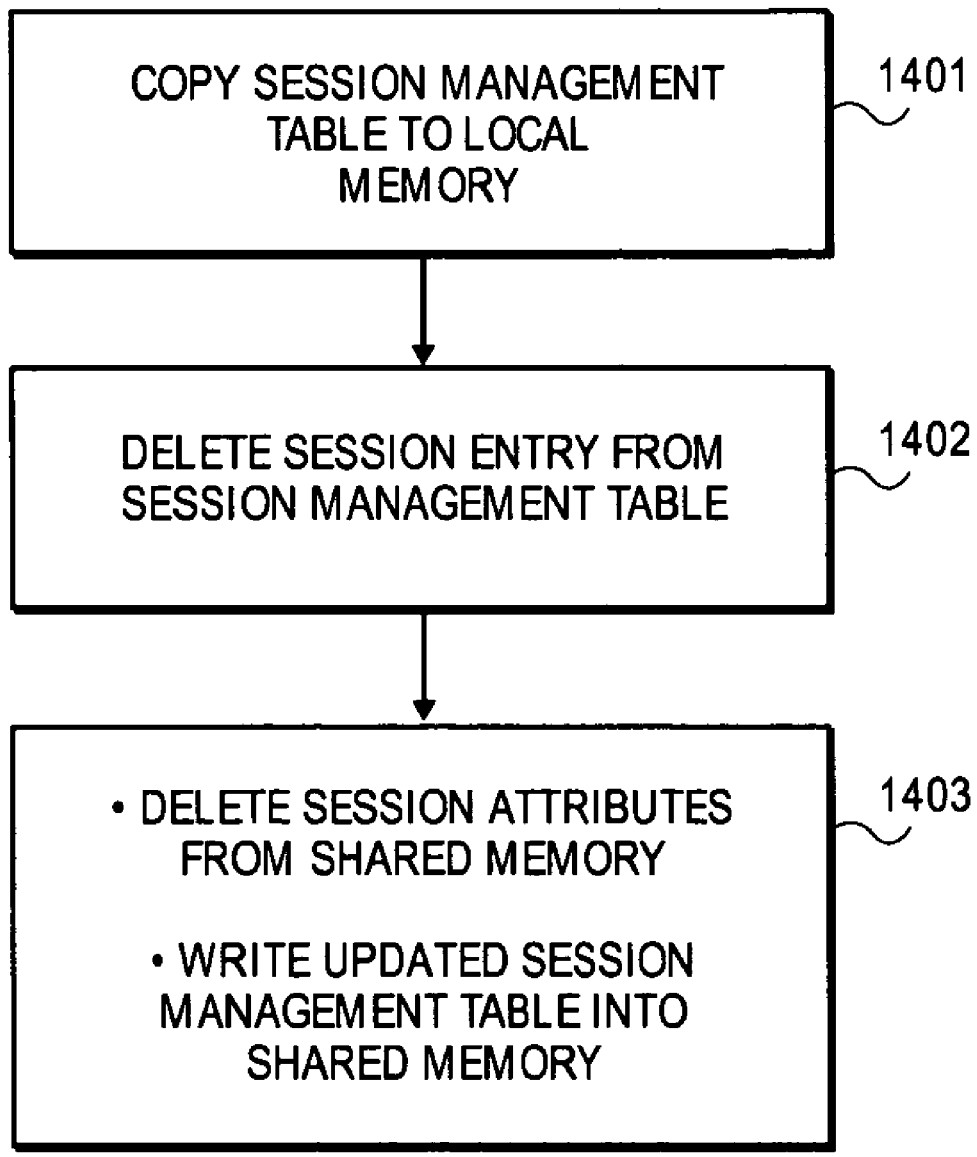
FIG. 14 shows a process for deleting a session from a session management table stored in shared memory.

FIGS. 13 and 14 show processes for adding and deleting sessions, respectively. For both processes, again, the session management table in shared memory is copied into the local memory of the virtual machine that intends to add or delete a session to/from the session domain. Note that copying the session management table leaves a version in shared memory so that other sessions in the session domain can be concurrently processed. This property is also true with respect to the request processing described above in FIG. 12 (i.e., an available session other than the session being referred to in FIG. 12 can be concurrently processed because the session management table in shared memory properly is accurate with respect to that other session).

In the case of the addition of a new session, the local virtual machine adds a new session entry to the local copy of the session management table 1302. In the case of the deletion of a session (e.g., because the session has been completed), the local virtual machine deletes an existing session entry from the local copy of the session management table 1402. In the case of the addition of a new session, any attributes that are to be written for the new session are written into the new session's session state shared closure in shared memory; and, the updated session management table in local memory is written into shared memory 1303. In the case of the deletion of an existing session, the session state shared closure for the session is deleted from shared memory; and, the updated session management table in local memory is written into shared memory 1403.

Figure 15:
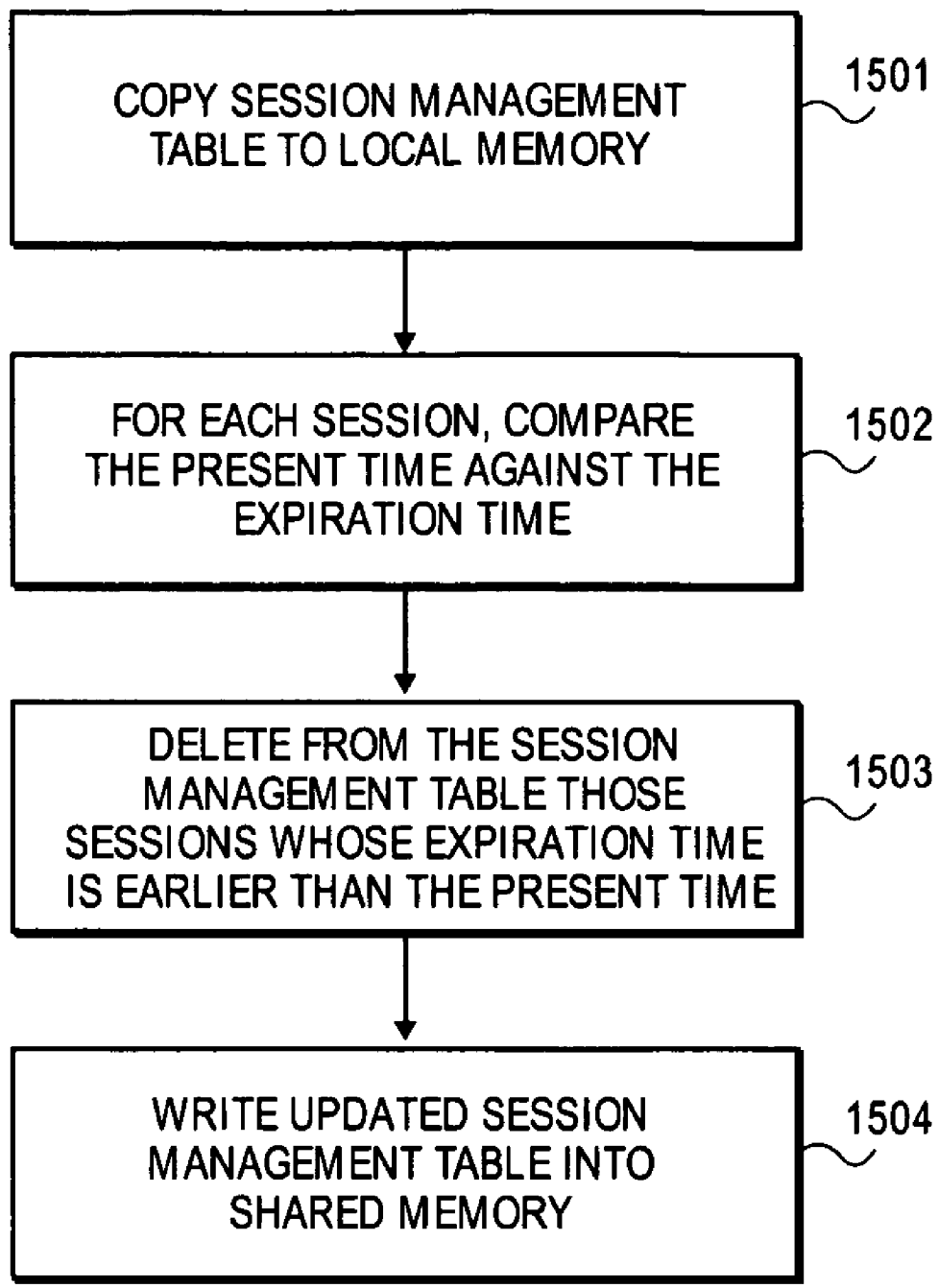
FIG. 15 shows a process for deleting expired sessions from a session management table stored in shared memory.

FIG. 15 demonstrates a process that identifies and removes all sessions in a session domain that have expired. Notably, the process of FIG. 15 may be combined with any of the processes described just above with respect to FIGS. 12, 13 and 14. According to the process of FIG. 15, the session management table is copied into local memory 1501. Here, the copy operation 1501 of FIG. 15 may be the same copy operation 1201, 1301, 1401 of FIGS. 12, 13 and 14, respectively. Once the table has been copied into local memory, the table is iterated through to see if any of the sessions within the session domain have expired (by comparing their expiration time against the present time) 1502.

Those sessions that are deemed expired are then deleted from the session management table 1503. Then, the updated session management table is written into shared memory 1504. Here, the writing 1504 of the updated session management table into shared memory of FIG. 15 may be the same write operation 1204, 1303, 1403 of FIGS. 12, 13, and 14 respectively. Likewise, processes 1502, 1503 may be performed concurrently and/or in series, alone or in combination with any of processes 1202, 1203, 1302 and 1402 of FIGS. 12, 13 and 14 respectively.

Figure 16:
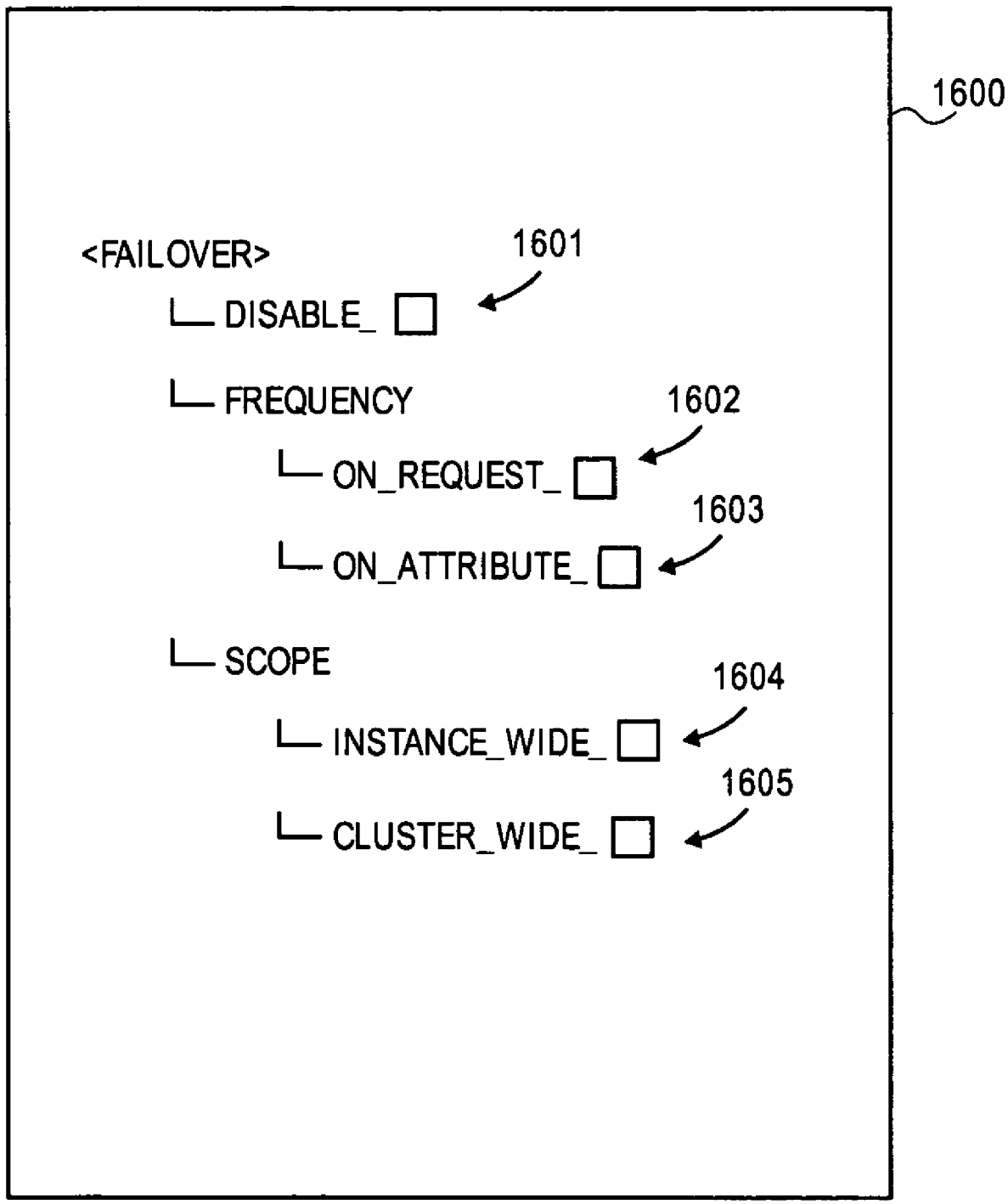
FIG. 16 shows a deployment descriptor for specifying a particular session management persistence strategy.
Figure 17:
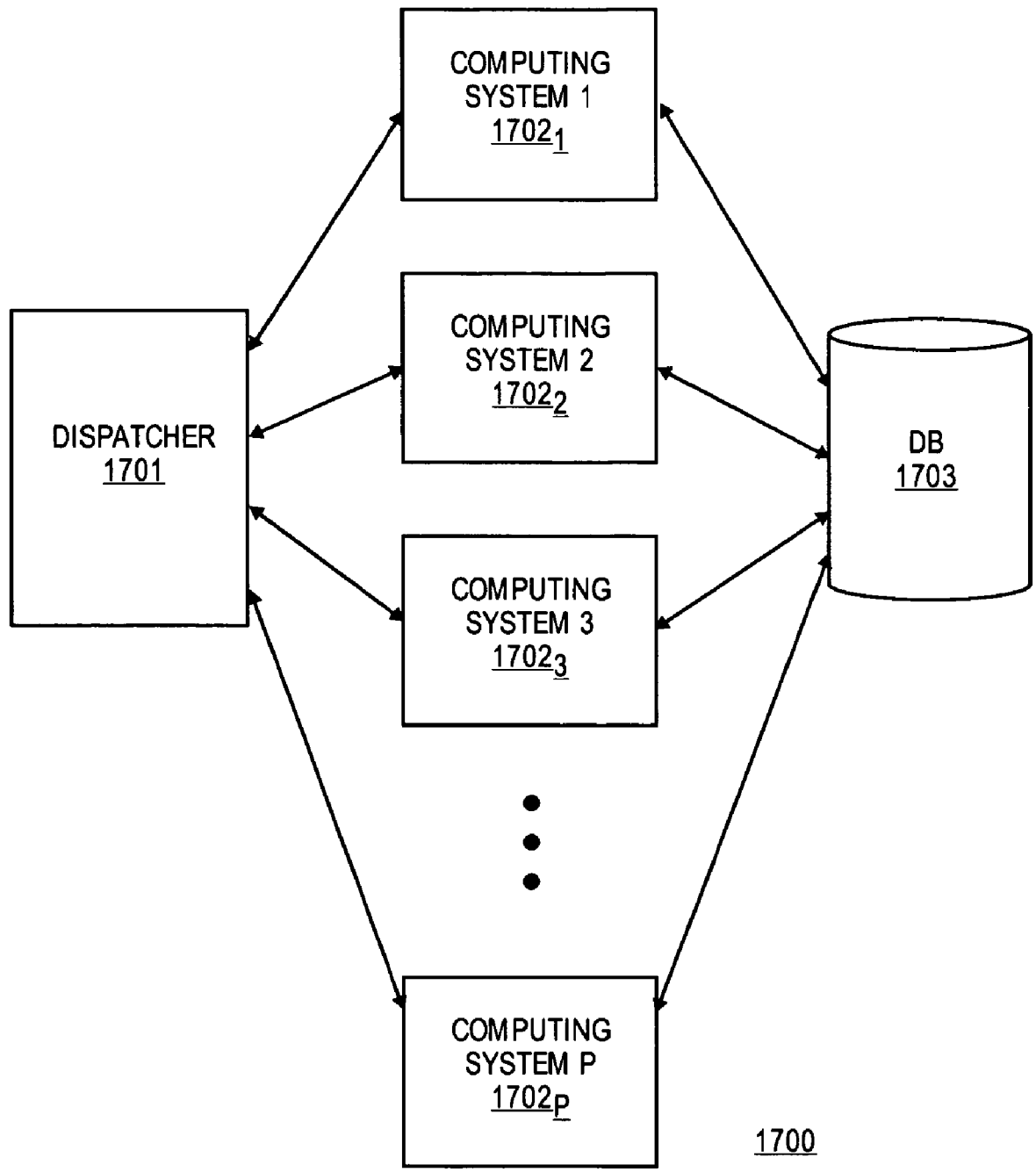
FIG. 17 (prior art) shows a cluster of computing systems.
Figure 18:
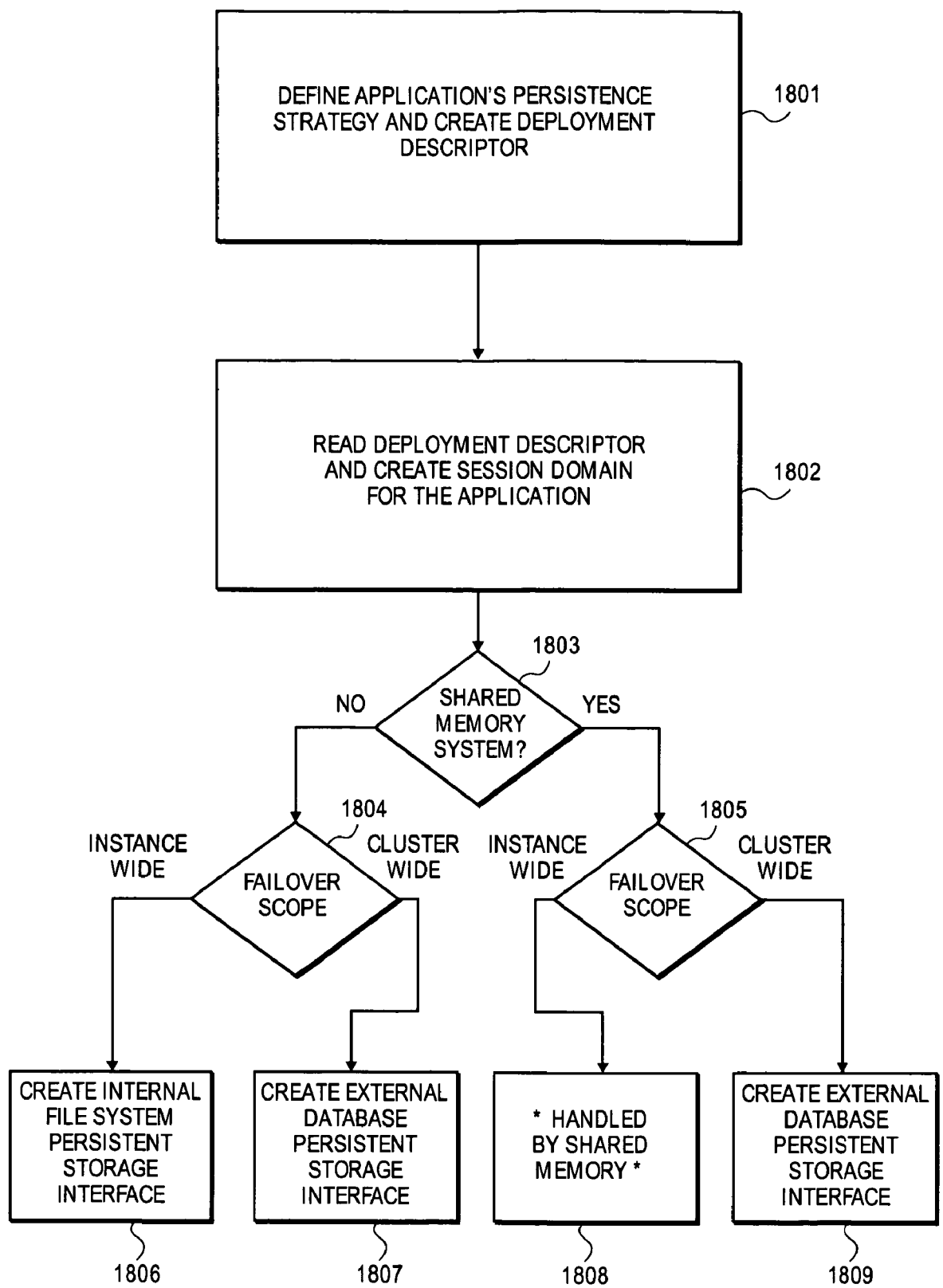
FIG. 18 shows a process for deploying applications according to a particular session management persistence strategy.

FIGS. 16 through 18 relate to the deployment of applications that are easily configured for a particular type of computing system, and, a particular persistent storage strategy defined by those who are deploying the applications. Importantly, low level details such as whether the targeted computing system is a "shared memory/shared closure" system (such as described above with respect to FIG. 9), or, is a not a "shared memory/shared closure" system (such as described above with respect to FIG. 8) are transparent to the deployer. A "scope" of persistence is merely defined at deployment time, and, the deployment process automatically configures the targeted computing system in light of the targeted computing system's capabilities.

FIG. 16 shows a deployment descriptor 1600 for defining the persistence strategy for one or more session domains. As is know in the art, a deployment descriptor is (often a text file or document) used to define particular variables that typically, are left as being "configurable" for the end-user who is deploying the software; and/or, depend on or are specific to the underlying platform (hardware and/or software) that the software is being deployed onto/into. Here, depending on implementation, a single deployment descriptor 1600 may define the persistence strategy for an entire computing system, groups of applications, a single application, groups of session domains or a single session domain.

The basic deployment descriptor embodiment 1600 of FIG. 16 includes a disable parameter 1601, frequency of persistence parameters 1602, 1603 and scope of persistence parameters 1604, 1605. The DISABLE parameter 1601 defines whether or not persistence is to be used. If the DISABLE parameter 1601 is affirmatively marked, in the case of computing systems that do not use failover protection through a shared memory feature (such as the prior art computing system 800 of FIG. 8), whatever session domain(s) that the deployment descriptor 1600 defines the strategy for will not instantiate a persistence storage interface (such as those described with respect to FIGS. 5, 6 and 7). In the case of computing systems that implement failover protection through a shared memory feature, the code that actually performs the failover protection is not activated, in some fashion, for the session domain(s) that the deployment descriptor 1600 defines the persistence storage strategy for.

The frequency parameters 1602, 1603 define the frequency at which session state information is persisted. If the ON_REQUEST parameter 1602 is affirmatively marked, session state information is persisted each time a request is processed (e.g., generally, the process of generating a response for the request) for a session whose session domain persistence strategy is defined by the deployment descriptor. If the ON_ATTRIBUTE parameter 1603 is affirmatively marked, session state information is persisted only if a session state attribute is changed as a consequence of processing a request. In an implementation, the expiration time is always persisted upon the generation of a new request irrespective of the ON_REQUEST or ON_ATTRIBUTE setting.

The scope parameters 1604, 1605 define what "level" or "depth" of persistence is to be implemented for the session domain(s) whose persistence strategy is defined by the deployment descriptor 1600. The term "instance", according to FIGS. 16, 17 and 18, refers to a single computing system. If the INSTANCE_WIDE parameter 1604 is affirmatively marked, the persistent storage for the session(s) that the deployment descriptor corresponds to is implemented within the computing system that software being deployed is deployed onto. Referring back to FIGS. 8 and 9, recall that virtual machines occasionally crash, and that, multiple virtual machines are instantiated within a single computing system. Here, instance wide persistence can be used for a computing system's own "internal" session failover protection. For example, a session that is handled by a first virtual machine—which crashes during the session—may be saved by second virtual machine that takes over the handling of the session, where, both virtual machines are instantiated within the same computing system.

The term "cluster" refers to a group of computing systems. FIG. 17 depicts a simple cluster of P computing systems $1702_1$ through $1702_P$ that are coupled together through a dispatcher 1701 at the cluster's "front-end" and a database 1703 at the cluster's "back-end". Typically, particularly in high performance data processing centers, many if not all of the computing systems $1702_1$ through $1702_P$ contain one or more of the same software applications.

Requests from clients are received by the dispatcher 1701, and the dispatcher 1701 determines, for each received request, which computing system is most fit to handle the request. In many cases, in the case of already existing sessions, the dispatcher will send the request to the computing system that processed the immediately previous request. In the case of requests that correspond to the first request of a new session, the dispatcher 1701 will determine which computing system (amongst those having the software capable of processing the client's request) should receive the request (e.g., based on a load balancing algorithm).

Because the computing systems are each coupled to a database 1703, it is possible to have inter-system session failover. That is, if a session is being handled by a first computing system (e.g., computing system $1702_1$) that persists the session's session domain information into the database 1703, and if that computing system suffers a complete failure, another computing system (e.g., computing system $1702_P$) will be able to read the persisted session domain information from the database 1703 and carry the session forward to completion. Thus, referring back to FIG. 16, if the CLUSTER_WIDE parameter 1605 is affirmatively marked, the persistent storage for the session(s) that the deployment descriptor corresponds to is to the computing system that the deployed software is being deployed on. The external persistent storage is presumably accessible to other computing systems (not necessarily all computing systems) within the cluster.

Importantly, certain application software may be deployable on both: 1) a computing system that does not embrace a shared memory structure that can be used for instance wide session failover protection (such as the computing system 800 of FIG. 8); and, 2) a computing system that does embrace a shared memory structure that does embrace a shared memory structure that can be used for instance wide session failover protection (such as computing system 900 of FIG. 9). In the former case instance wide failover protection should be implemented on an internal file system, and, in the later case, instance wide failover protection should be implemented with shared memory.

Moreover, preferably, the end user who is attempting to deploy the software should not have to comprehend whether file system persistence or shared memory persistence is appropriate. From the end-user's perspective, all that should need to be defined is whether the persistence is instance-wide or cluster-wide. The deployment descriptor embodiment of FIG. 16 is consistent with this perspective.

FIG. 18 shows a deployment process that can properly implement instance wide persistence on non-shared memory and shared memory systems alike even though the deployment descriptor does not articulate the proper type of persistent storage technology (file system or shared memory). According to the deployment process of FIG. 18, as a basic example, it is assumed that the session domain for which a deployment descriptor is prepared and deployed pertains only to a single application (i.e., the deployment descriptor defines the persistence strategy for a single application. Of course, consistent with statements made earlier above, the session domain range of a deployment descriptor can be made to vary from embodiment to embodiment.

Referring to FIG. 18, a deployment descriptor that defines an application's persistent storage strategy is first created and deployed to a computing system 1801. The deployment descriptor is read by the computing system that the descriptor was deployed to, and, a session domain is created for the descriptor's corresponding application 1802. Importantly, the deployed to computing system "knows" whether its instance wide persistence is a file system or shared memory. That is, a computing system that does not include shared memory technology will interpret a setting of "instance wide" in the deployment descriptor as a directive to implement file system persistent storage 1804, 1806. As such a file system persistent storage interface will be instantiated for the application's session domain 1806.

By contrast, a computing system that does include shared memory technology will interpret a setting of "instance wide" in the deployment descriptor as a directive to use shared memory as the persistent storage 1805, 1808. As such, a persistent storage interface will not be instantiated for the application's session domain 1808. Irrespective of the type of computing system being deployed to, a setting of "cluster wide" in the deployment descriptor will be interpreted by both systems as a directive to employ an external database (or external file system, external RAID system or external tape drive if that happens to be the external persistence solution) 1804, 1807 and 1805, 1809. In either of these cases a database persistent storage interface will be instantiated for the application's session domain.

Moreover, conceivably, more than one persistent storage solution may be specified for a particular session domain. For example, in the case of a file system without shared memory technology, if both "instance wide" and "cluster wide" persistence is affirmatively marked in the deployment descriptor, an internal file system persistent storage interface and an external database persistent storage interface will be instantiated for the application's session domain. In more elaborate embodiments the deployment descriptor may be made to contain more specific information. For example, in the case where multiple internal or external persistent storage solutions are available, the deployment descriptor may particularly specify which persistent storage solution is to be used for the descriptor's corresponding session domain(s).

Processes taught by the discussion above may be performed with program code such as machine-executable instructions which cause a machine (such as a "virtual machine", a general-purpose processor disposed on a semiconductor chip or special-purpose processor disposed on a semiconductor chip) to perform certain functions. Alternatively, these functions may be performed by specific hardware components that contain hardwired logic for performing the functions, or by any combination of programmed computer components and custom hardware components.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

Figure 19:
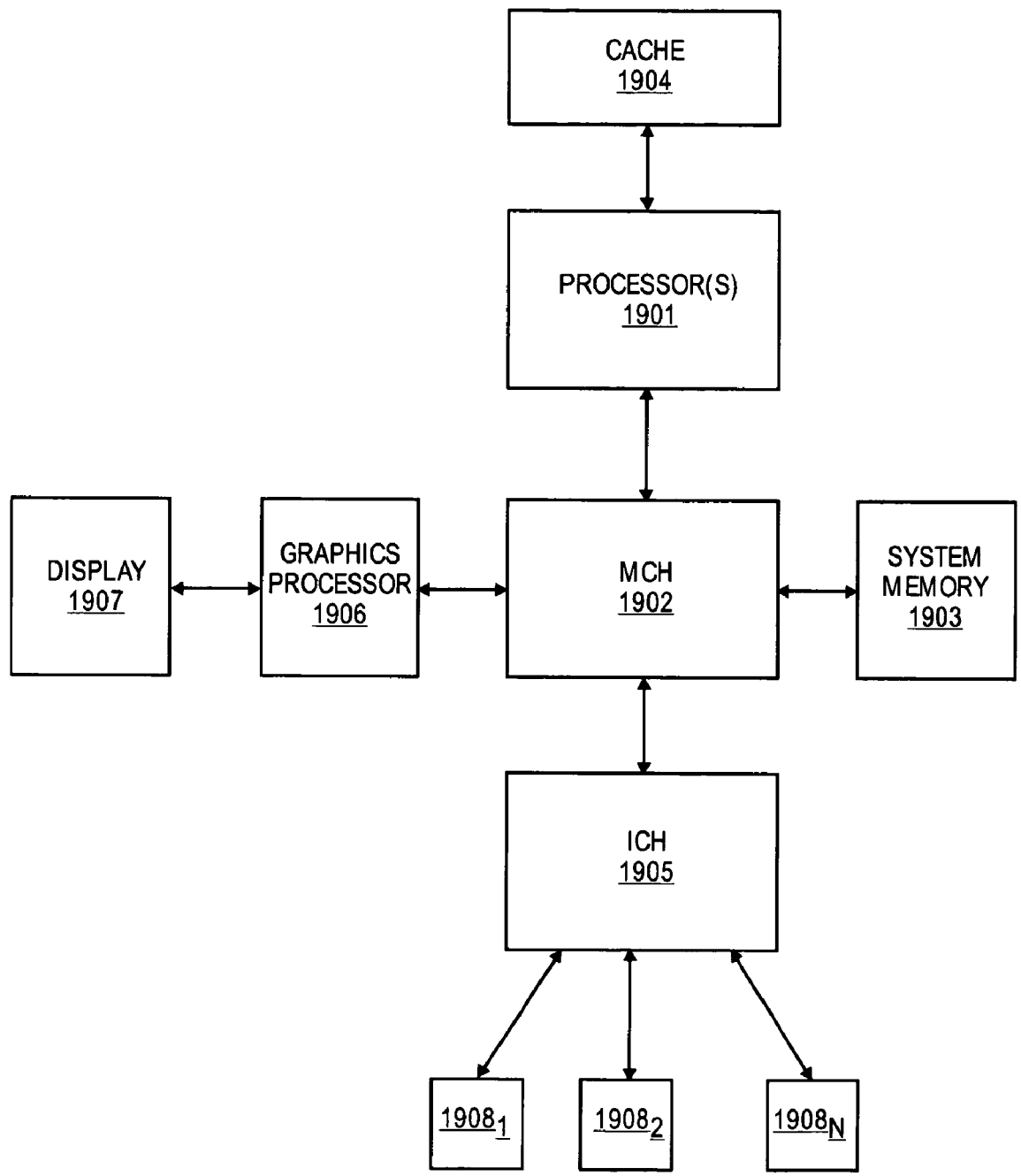
FIG. 19 shows an embodiment of a computing system's hardware design.

FIG. 19 shows an embodiment of a computing system (e.g., "a computer"). The exemplary computing system of FIG. 19 includes: 1) one or more processors 1901 having an "on-chip" DC-DC converter 1910; 2) a memory control hub (MCH) 1902; 3) a system memory 1903 (of which different types exist such as DDR RAM, EDO RAM, etc,); 4) a cache 1904; 5) an I/O control hub (ICH) 1905; 19) a graphics processor 1906; 19) a display/screen 1907 (of which different types exist such as Cathode Ray Tube (CRT), Thin Film Transistor (TFT), Liquid Crystal Display (LCD), DPL, etc.; 8) one or more I/O devices 1908.

The one or more processors 1901 execute instructions in order to perform whatever software routines the computing system implements. The instructions frequently involve some sort of operation performed upon data. Both data and instructions are stored in system memory 1903 and cache 1904. Cache 1904 is typically designed to have shorter latency times than system memory 1903. For example, cache 1904 might be integrated onto the same silicon chip(s) as the processor(s) and/or constructed with faster SRAM cells whilst system memory 1903 might be constructed with slower DRAM cells. By tending to store more frequently used instructions and data in the cache 1904 as opposed to the system memory 1903, the overall performance efficiency of the computing system improves.

System memory 1903 is deliberately made available to other components within the computing system. For example, the data received from various interfaces to the computing system (e.g., keyboard and mouse, printer port, LAN port, modem port, etc.) or retrieved from an internal storage element of the computing system (e.g., hard disk drive) are often temporarily queued into system memory 1903 prior to their being operated upon by the one or more processor(s) 1901 in the implementation of a software program. Similarly, data that a software program determines should be sent from the computing system to an outside entity through one of the computing system interfaces, or stored into an internal storage element, is often temporarily queued in system memory 1903 prior to its being transmitted or stored.

The ICH 1905 is responsible for ensuring that such data is properly passed between the system memory 1903 and its appropriate corresponding computing system interface (and internal storage device if the computing system is so designed). The MCH 1902 is responsible for managing the various contending requests for system memory 1903 access amongst the processor(s) 1901, interfaces and internal storage elements that may proximately arise in time with respect to one another.

One or more I/O devices 1908 are also implemented in a typical computing system. I/O devices generally are responsible for transferring data to and/or from the computing system (e.g., a networking adapter); or, for large scale non-volatile storage within the computing system (e.g., hard disk drive). ICH 1905 has bidirectional point-to-point links between itself and the observed I/O devices 1908.

It is believed that processes taught by the discussion above can be practiced within various software environments such as, for example, object-oriented and non-object-oriented programming environments, Java based environments (such as a Java 2 Enterprise Edition (J2EE) environment or environments defined by other releases of the Java standard), or other environments (e.g., a NET environment, a Windows/NT environment each provided by Microsoft Corporation).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. A method, comprising:
  in a computing system with multiple virtual machines and where said computing system does not support persistence of session information in a shared memory that is internal to said computing system and that is accessible to each of said virtual machines:
  a) receiving a deployment descriptor that specifies a persistence scope that does not extend beyond said computing system;
  b) as a consequence of said receiving, instantiating a plug-in to a persistence interface for said computing system's file system; and, c) over the course of a session, managing the persistence of said session's session state information in said computing system's file system by translating, with program code provided by said plug-in, a first command that is not specific to said file system into a second command that is specific to said file system, said session state information comprising a plurality of attributes, said first command to cause a process to be performed, said process selected from the group consisting of:
storing in said file system one of said attributes; and,
retrieving from said file system one of said attributes.

2. The method of claim 1 wherein said managing the persistence of said session's session state information with code provided by said plug-in further comprises storing said session information in a directory of said file system, said directory containing session state information for other sessions that are managed according to said session's session management criteria.

3. The method of claim 2 wherein said managing the persistence of said session's session state information with program code provided by said plug-in further comprises translating a third command that is not specific to said file system into a fourth command that is specific to said file system, said third command to cause a second process to be performed, said second process selected from the group consisting of:
retrieving from said file system one of said attributes and a same attribute from the session state information of said other sessions;
retrieving from said file system one of said attributes and a same attribute from the session state information of those of said other sessions that are expired, said session also being expired; and,
retrieving from said file system all of said attributes and all attributes from those of said sessions that are expired, said session also being expired.

4. The method of claim 1 wherein said managing the persistence of said session's session state information with program code provided by said plug-in further comprises translating a third command that is not specific to said file system into a fourth command that is specific to said file system, said third command to cause a second process to be performed, said second process selected from the group consisting of:
retrieving from said file system all of said attributes; and
deleting from said file system all of said attributes.

5. The method of claim 1 wherein:
said one of said attributes is serialized prior to said storing; and,
said one of said attributes is deserialized after said storing.

6. The method of claim 1 wherein said managing the persistence of said session's session state information with program code provided by said plug-in further comprises translating a third command that is not specific to said file system into a fourth command that is specific to said file system, said third command to cause a second process to be performed, said second process selected from the group consisting of:
retrieving a session identification for said session;
retrieving information used to determine if said session has expired;
updating information used to determine if said session has expired.

7. An article of manufacture including program code which, when executed by a machine, causes the machine to perform a method, the method comprising:
in a computing system with multiple virtual machines and where said computing system does not support persistence of session information in a shared memory that is internal to said computing system and that is accessible to each of said virtual machines:
a) as a consequence of processing a received deployment descriptor that specifies a persistence scope that does not extend beyond said computing system, instantiating a plug-in to a persistence interface for said computing system's file system; and,
b) over the course of a session, managing the persistence of said session's session state information in said computing system's file system by, with program code provided by said plug-in, translating a first command that is not specific to said file system into a second command that is specific to said file system, said session state information comprising a plurality of attributes, said first command to cause a process to be performed, said process selected from the group consisting of:
storing in said file system one of said attributes; and,
retrieving from said file system one of said attributes.

8. The article of manufacture of claim 7 wherein said managing the persistence of said session's session state information with code provided by said plug-in further comprises storing said session information in a directory of said file system, said directory containing session state information for other sessions that are managed according to said session's session management criteria.

9. The article of manufacture of claim 8 wherein said managing the persistence of said session's session state information with program code provided by said plug-in further comprises translating a third command that is not specific to said file system into a fourth command that is specific to said file system, said third command to cause a second process to be performed, said second process selected from the group consisting of:
retrieving from said file system one of said attributes and a same attribute from the session state information of said other sessions;
retrieving from said file system one of said attributes and a same attribute from the session state information of those of said other sessions that are expired, said session also being expired; and,
retrieving from said file system all of said attributes and all attributes from those of said sessions that are expired, said session also being expired.

10. The article of manufacture of claim 7 wherein said managing the persistence of said session's session state information with program code provided by said plug-in further comprises translating a third command that is not specific to said file system into a fourth command that is specific to said file system, said third command to cause a second process to be performed, said second process selected from the group consisting of:
retrieving from said file system all of said attributes; and
deleting from said file system all of said attributes.

11. The article of manufacture of claim 7 wherein:
said one of said attributes is serialized prior to said storing; and,
said one of said attributes is deserialized after said storing.

12. The article of manufacture of claim 7 wherein said managing the persistence of said session's session state information with program code provided by said plug-in further comprises translating a third command that is not specific to said file system into a fourth command that is specific to said file system, said third command to cause a second process to be performed, said second process selected from the group consisting of:
retrieving a session identification for said session;
retrieving information used to determine if said session has expired;

updating information used to determine if said session has expired.

13. A computing system comprising a machine, said computing system also comprising instructions disposed on a computer readable medium, said instructions capable of being executed by said machine to perform a method, computing system comprising multiple virtual machines, said computing system not supporting persistence of session information in a shared memory that is internal to said computing system and that is accessible to each of said virtual machines, said method comprising:
  a) as a consequence of processing a received deployment descriptor that specifies a persistence scope that does not extend beyond said computing system, instantiating a plug-in to a persistence interface for said computing system's file system; and,
  b) over the course of a session, managing the persistence of said session's session state information in said computing system's file system by, with program code provided by said plug-in, translating a first command that is not specific to said file system into a second command that is specific to said file system, said session state information comprising a plurality of attributes, said first command to cause a process to be performed, said process selected from the group consisting of:
    storing in said file system one of said attributes; and,
    retrieving from said file system one of said attributes.

14. The computing system of claim 13 wherein said managing the persistence of said session's session state information with code provided by said plug-in further comprises storing said session information in a directory of said file system, said directory containing session state information for other sessions that are managed according to said session's session management criteria.

15. The computing system of claim 14 wherein said managing the persistence of said session's session state information with program code provided by said plug-in further comprises translating a third command that is not specific to said file system into a fourth command that is specific to said file system, said third command to cause a second process to be performed, said second process selected from the group consisting of:
    retrieving from said file system one of said attributes and a same attribute from the session state information of said other sessions;
    retrieving from said file system one of said attributes and a same attribute from the session state information of those of said other sessions that are expired, said session also being expired; and,
    retrieving from said file system all of said attributes and all attributes from those of said sessions that are expired, said session also being expired.

16. The computing system of claim 13 wherein said managing the persistence of said session's session state information with program code provided by said plug-in further comprises translating a third command that is not specific to said file system into a fourth command that is specific to said file system, said third command to cause a second process to be performed, said second process selected from the group consisting of:
    retrieving from said file system all of said attributes; and
    deleting from said file system all of said attributes.

17. The computing system of claim 13 wherein:
    said one of said attributes is serialized prior to said storing; and,
    said one of said attributes is deserialized after said storing.

18. The computing system of claim 13 wherein said managing the persistence of said session's session state information with program code provided by said plug-in further comprises translating a third command that is not specific to said file system into a fourth command that is specific to said file system, said third command to cause a second process to be performed, said second process selected from the group consisting of:
    retrieving from said file system a session identification for said session;
    retrieving from said file system information used to determine if said session has expired;
  updating in said database information used to determine if said session has expired.

* * * * *